United States Patent
Futaki

(10) Patent No.: US 10,224,985 B2
(45) Date of Patent: Mar. 5, 2019

(54) RADIO COMMUNICATING SYSTEM, RADIO COMMUNICATING METHOD, RADIO STATION, CONTROL STATION AND PROGRAM

(71) Applicant: Hisashi Futaki, Tokyo (JP)

(72) Inventor: Hisashi Futaki, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 0 days.

(21) Appl. No.: 14/802,612

(22) Filed: Jul. 17, 2015

(65) Prior Publication Data

US 2015/0326282 A1 Nov. 12, 2015

Related U.S. Application Data

(63) Continuation of application No. 13/389,401, filed as application No. PCT/JP2010/063407 on Aug. 6, 2010.

(30) Foreign Application Priority Data

Aug. 7, 2009 (JP) ................................ 2009-184996

(51) Int. Cl.
| | | |
|---|---|---|
| H04B 7/00 | (2006.01) | |
| H04B 7/024 | (2017.01) | |
| H04W 24/02 | (2009.01) | |
| H04W 72/04 | (2009.01) | |
| H04L 5/00 | (2006.01) | |
| H04W 24/00 | (2009.01) | |
| H04W 92/20 | (2009.01) | |

(52) U.S. Cl.
CPC ........... *H04B 7/024* (2013.01); *H04L 5/0023* (2013.01); *H04L 5/0035* (2013.01); *H04W 24/02* (2013.01); *H04W 72/0426* (2013.01); *H04W 24/00* (2013.01); *H04W 92/20* (2013.01)

(58) Field of Classification Search
CPC ...... H04B 1/1036; H04W 4/00; H04W 72/04; H04W 24/02; H04L 5/0035; H04L 5/0023
USPC .......... 455/509, 517, 404.1, 452.1; 370/241, 370/328, 331
See application file for complete search history.

(56) References Cited

U.S. PATENT DOCUMENTS

| | | |
|---|---|---|
| 5,854,981 A | 12/1998 | Wallstedt et al. |
| 5,915,221 A | 6/1999 | Sawyer et al. |
| 8,583,119 B2 | 11/2013 | Catovic et al. |

(Continued)

FOREIGN PATENT DOCUMENTS

| | | |
|---|---|---|
| CN | 101483873 A | 7/2009 |
| JP | 8-163130 A | 6/1996 |

(Continued)

OTHER PUBLICATIONS

U.S. Appl. No. 13/389,401, filed Feb. 7, 2012.*

(Continued)

*Primary Examiner* — Sanh D Phu
(74) *Attorney, Agent, or Firm* — Sughrue Mion, PLLC

(57) ABSTRACT

A radio station communicates control information for multipoint cooperating communication, in which a plurality of radio stations takes part in data transmission/reception of a terminal, with another radio station taking part in the multipoint cooperating communication and/or a control station that manages the radio station.

19 Claims, 22 Drawing Sheets

(56) References Cited

U.S. PATENT DOCUMENTS

| | | | |
|---|---|---|---|
| 8,731,480 B2* | 5/2014 | Kim | H04B 7/024 370/238 |
| 2007/0202921 A1 | 8/2007 | Stern-Berkowitz et al. | |
| 2008/0153454 A1 | 6/2008 | Haapapuro et al. | |
| 2008/0207209 A1 | 8/2008 | Katori et al. | |
| 2009/0046573 A1* | 2/2009 | Damnjanovic | H04J 11/0093 370/216 |
| 2009/0111473 A1 | 4/2009 | Tao et al. | |
| 2009/0129342 A1 | 5/2009 | Hwang et al. | |
| 2009/0257398 A1 | 10/2009 | Koyanagi et al. | |
| 2009/0257402 A1 | 10/2009 | Zhu et al. | |
| 2010/0208707 A1 | 8/2010 | Hamabe et al. | |
| 2011/0038330 A1 | 2/2011 | Luo et al. | |
| 2012/0281544 A1 | 11/2012 | Anepu et al. | |

FOREIGN PATENT DOCUMENTS

| | | |
|---|---|---|
| JP | 2000-505251 A | 4/2000 |
| JP | 2002-232928 A | 8/2002 |
| JP | 2007-027909 A | 2/2007 |
| JP | 2008-022309 A | 1/2008 |
| JP | 2008-236730 A | 10/2008 |
| JP | 2008-283700 A | 11/2008 |
| WO | 2009/041498 A1 | 4/2009 |
| WO | 2009/057438 A1 | 5/2009 |
| WO | 2009/057520 A1 | 5/2009 |
| WO | 2009/088999 A1 | 7/2009 |
| WO | 2010/072019 A1 | 7/2010 |
| WO | 2010122818 A1 | 10/2010 |

OTHER PUBLICATIONS

Communication dated Oct. 13, 2015 from the Japanese Patent Office issued in corresponding application No. 2014-258295.
"Discussion on over-the air communication for CoMP", 3GPP TSG RAN WG1 #57bis meeting, R1-092439, Los Angeles, USA, Jun. 29-Jul. 3, 2009, pp. 1-2.
"Discussion on Information Exchange Aspects of DL CoMP", 3GPP TSG RAN WG1 Meeting #56, R1-090686, Athens, Greece, Feb. 9-13, 2009, 5 pages total.
"Consideration on determining cooperative eNBs in Joint Transmission", 3GPP TSG RAN1 #57b, R1-092593, Los Angeles, US, Jun. 29-Jul. 3, 2009, 6 pages total.
"Discussions on CoMP Cooperating Set", 3GPP TSG-RAN WG1 #57bis, R1-092833, Los Angeles, USA, Jun. 29-Jul. 3, 2009, 5 pages total.
"Enabling Coordinated Multi-Point Reception", 3GPP TSG RAN WG1 #56, R1-090587, Athens, Greece Feb. 9-13, 2009, 5 pages total.
Communication dated Jan. 5, 2016 from the Japanese Patent Office in counterpart application No. 2014-161290.
Huawei, Consideration on CSI-RS design for CoMP and text proposal to 36.814, 3GPP TSG-RAN WG1#57b R1-092364, Internet <URL:http://www.3gpp.org/ftp/tsg_ran/WG1_RL1/TSGR1_57b/Docs/R1-092364.zip>, Jun. 29, 2009, 9 pages total.
Huawei, RAN2 considerations for coordinated multipoint transmission and reception, 3GPP TSG-RAN WG2 meeting #66 R2-093107, Internet <URL:http://www.3gpp.org/ftp/tsg_ran/WG2_RL2/TSGR2_66/Docs/R2-093107.zip>, May 4, 2009, 5 pages total.
3rd Generation Partnership Project; Technical Specification Group Radio Access Network; Evolved Universal Terrestrial Radio Access Network (E-UTRAN); Self-configuring and self-optimizing network use cases and solutions (Release 9); 3GPP TR 36.902 V1.1.0 (Apr. 2009), 2 pages total.
Communication dated May 31, 2016, issued by the Japan Patent Office in corresponding Japanese Application No. 2014-258295.
Communication dated Aug. 7, 2015 from the United States Patent Office issued in corresponding application No. 13389401.
An Office Action dated Nov. 18, 2016, which issued during the prosecution of U.S. Appl. No. 13/389,401.

Communication dated Dec. 20, 2016, from the European Patent Office in counterpart European Application No. 10806559.0.
"CoMP clarification of definitions and TP", 3GPP TSG RAN WG1 #54bis, R1-083709, Prague, Czech Republic, Sep. 29-Oct. 3, 2008, 6 pages total.
3GPP TR 36.814, "Evolved Universal Terrestrial Radio Access (E-UTRA); Further advancements for E-UTRA Physical layer aspects," 3GPP A Global Initiative, 2009, pp. 1.
3GPP TS 36.300, "Evolved Universal Terrestrial Radio Access (E-UTRA) and Evolved Universal Terrestrial Radio Access Network (E-UTRAN); Overall description; Stage 2," 3GPP A Global Initiative, 2009, pp. 1-2.
NGMN, "A Deliverable by the NGMN Alliance: NGMN Use Cases related to Self Organising Network, Overall Description," NGMN the Engine of broadband wireless innovation, 2007, pp. 1-17.
NTT DOMCOMO, "Views on Coordinated Multipoint Transmission/Receiption in LTE-Advanced," 3GPP TSG RAN WG1 Meeting #54bis R1-083686, Oct. 3, 2008, pp. 10-13.
Notice of Opinion dated Jul. 10, 2013 issued by the Korean Intellectual Patent Office in counterpart Korean Application No. 1020127003231.
CATT, "Impact of CoMP on Control Plane," 3GPP TSG RAN WG2 Meeting #66bis, R2-093727, Jun. 29, 2009 to Jul. 3, 2009, pp. 1-5.
Samsung, "Inter-Cell Interference Mitigation Through Limited Coordination," 3GPP TSG RAN WG1 Meeting #54 R1-082886, Aug. 18-22, 2008, pp. 1-8.
Communication dated Apr. 14, 2015 from the Japanese Patent Office in counterpart application No. 2014-161290.
Qualcomm Europe, Downlink transmission modes in LTE-A[online], 3GPP TSG-RAN WGI#57b R1-092718, Internet <URL://www.3gpp.org/ftp/tsg_ran/WG1_RL1/TSGR1_57b/Docs/R1-092718.zip>, Jun. 29, 2009, 3 pages total.
Communication dated Oct. 23, 2014 from the State Intellectual Property Office of the People's Republic of China in counterpart application No. 201080035058.X.
Communication dated Feb. 8, 2014, issued by the State Intellectual Property Office of the People's Republic of China in corresponding Application No. 201080035058.X.
"Views on Coordinated Multipoint Transmission/Reception in LTE-Advanced", NTT DOCOMO, Inc., 3GPP TSG RAN WG1 Meeting #54bis, Prague, Czech Republic, Sep. 29-Oct. 3, 2008, R1-083686, 13 total pages.
Communication dated Aug. 23, 2016, from the Japanese Patent Office in counterpart Japanese application No. 2014-161290.
Alcatel-Lucent Shanghai Bell, Alcatel, "Generic Configuration of DL CoMP Modes", 3 GPP TSG-RAN WG1#57bis, R1-092319, USA, Jun. 29-Jul. 3, 2009, 2 pages total.
Fujitsu, "Discussion on Some Aspects of Signaling for CoMP Operation", 3GPP TSG RAN2 Meeting #66bis R2-093959, Jun. 29-Jul. 3, 2009, pp. 2-5 (4 pages total).
Nokia, Siemens Networks, Nokia,"Setup of CoMP Cooperation Areas", 3GPP TSG-RAN WG1 Meeting #55bis, R1-090237, Jan. 12-16, 2009, pp. 2-5 (4 pages total).
LG Electronics, " UE Measurement and Feedback for DL CoMP", 3GPP TSG RAN WG1 Meeting #56bis, R1-091193, Mar. 16-20, 2009, pp. 2-4 (3 pages total).
Qualcomm Europe, "TP for feedback in support of DL CoMP for LTE-A TR", 3GPP TSG-RAN WG1 #57, R1-092284, May 4-8, 2009, pp. 2-5 (4 pages total).
Communication dated Jun. 13, 2017 from the Japanese Patent Office in counterpart Application No. 2016-167190.
Qualcomm Europe, "CoMP Cooperative Silencing Hotzone DL Performance," 3GPP TSG-RAN WG1 #57bis Jun. 29-Jul. 3, 2009 Los Angeles, USA; R1-092692 (11 pages total).
Communication dated Mar. 13, 2018 from the Japanese Patent Office in counterpart Japanese application No. 2016-167190.
LG Electronics, "Mixed CoMP Operation" [online], 3GPP TSG RAN WG1 Meeting #57, San Francisco, USA, R1-092114, May 4-8, 2009, pp. 1-4 (4 pages).
Communication dated Oct. 23, 2017 issued by the Intellectual Property Office of India in counterpart application No. 2010/CHENP/2012.

(56) References Cited

OTHER PUBLICATIONS

Communication dated Sep. 12, 2018 from the State Intellectual Property Office of the P.R.C. in counterpart Chinese application No. 201510818783.9.
"Coordinated Multi-Point downlink transmission in LTE-Advanced", 3GPP TSG-RAN WG1 #55, R1-084400, Nov. 10-15, 2008, Czech Republic, 5 pages.
"Summary of email discussions for CoMP", 3GPP TSG-RAN WG1 #57, R1-092232, May 4-8 2009, USA, 17 pages.

* cited by examiner

FIG. 7

| NR | Target Cell ID | No Remove | No HO | No X2 |
|----|----------------|-----------|-------|-------|
| 1  | TCI#2          | ✓         |       |       |
| 2  | TCI#3          |           |       |       |
| 3  | TCI#4          | ✓         | ✓     |       |
| :  | :              |           |       |       |

FIG. 8

| NR | Target Cell ID | No Remove | No HO | No X2 | CoMP |
|---|---|---|---|---|---|
| 1 | TCI#2 | ✓ | | | ✓ |
| 2 | TCI#3 | | | | |
| 3 | TCI#4 | ✓ | ✓ | | ✓ |
| : | : | | | | |

FIG. 9

| NR | Target Cell ID | No Remove | No HO | No X2 | CoMP | |
|---|---|---|---|---|---|---|
| 1 | TCI#2 | ✓ | | | ✓ | #1 |
| 2 | TCI#3 | | | | | |
| 3 | TCI#4 | ✓ | ✓ | | ✓ | #2 |
| ⋮ | ⋮ | | | | | |

RADIO COMMUNICATING SYSTEM, RADIO COMMUNICATING METHOD, RADIO STATION, CONTROL STATION AND PROGRAM

CROSS-REFERENCE TO RELATED APPLICATIONS

The present application is a Continuation of U.S. application Ser. No. 13/389,401 filed Feb. 7, 2012, which is a National Stage Entry of International Application PCT/JP2010/063407 filed Aug. 6, 2010, which asserts priority rights based on JP Patent Application 2009-184996 filed on Aug. 7, 2009. The entire contents of disclosure of the Patent Application of the senior filing date are to be incorporated by reference into the present Application.

TECHNICAL FIELD

This invention relates to a radio communicating technique. More particularly, it relates to a system that may be applied to advantage to a radio communication system in which a plurality of radio base stations may have communication simultaneously with a terminal.

BACKGROUND

In 3GPP LTE (3rd Generation Partnership Project Long Term Evolution), as one of the next-generation cellular systems, investigations into SON (Self Organizing Network) are going on from the perspective of reducing the operation expenditure (OPEX).

SON has such functions as
self-configuration;
self-optimization; and
self-healing.

Techniques for achieving the different objectives are being considered (Non-Patent Documents 1 and 2).

In Non-Patent Document 2, as one of SON techniques there is listed radio parameter optimization with a view to accomplish respective objectives, such as maximizing the throughput, minimizing the delay or maximizing the coverage.

Examples of radio parameters include the transmission power of a radio base station (sometimes abbreviated to a 'base station'), an antenna tilt angle of a base station, neighbor cell information and handover parameters. One or more of these radio parameters are changed as necessary to accomplish the above objectives.

In the following, attention is focused on the neighbor cell information, out of the above radio parameters, which is related to the present invention.

In LTE, there is stipulated an ANR (Automatic Neighbor Relation) function as one of methods for optimizing the neighbor cell list (Non-Patent Document 1). This ANR function renders it possible to automatically add a cell (not a target for a measurement report) that is not recognized by a base station of a serving cell to a neighbor cell list. The following describes the ANR function that generates a neighbor cell list of the same frequency in the LTE system, as an example, with reference to FIG. 18.

In FIG. 18, it is assumed that a terminal (UE: user equipment) is in a cell1 and communicates with a base station 1 (eNB1), and that a cell2 is adjacent to the cell1.

It is assumed that the presence of an eNB2 (cell2) is not recognized by the eNB1.

The UE detects that a received power of a down-link reference signal (pilot signal) received from the cell2 is greater than or equal to a given threshold value ((Measurement (Phy CID=5) <step 0>. The UE notifies the eNB1 of the physical cell ID of the cell2 (Physical Cell ID: Phy CID=5) and the received power value with a measurement report (Measurement report) <step 1>.

Since the eNB1 is informed by this report of the presence of Phy CID (=5) the eNB1 does not recognize, the eNB1 requests a global cell ID (Global CID) from the UE as the further information regarding the relevant cell (Report Global CID request) <step 2>.

The UE reads the broadcast information of the cell2 broadcasted over BCH (Broadcast CHannel), detects the Global CID of the cell2 (=19) <step 3>, and makes a report to the eNB1 (Report Global CID=19) <step 4>.

The eNB1 then establishes connection with the eNB2 (X2 setup) and exchanges with the eNB2 information such as served cell lists (Served cell lists) mutually. X2 is a logical connection (interface) between eNB's.

The information necessary for optimizing the neighbor cell list may thus be obtained. The base station determines whether or not to add the new cell to the neighbor cell list, depending on whether or not the value of the received power of the downlink signal of another cell reported by a terminal is greater than or equal to a given threshold value and whether or not the number of times of the report exceeds a given number (Patent Document 1).

FIG. 19 is a diagram illustrating the ANR function of the eNB and the NRT (see Non-Patent Document 1). Specifically, FIG. 19 shows an example of a neighbor cell list retained by an eNB. The neighbor cell list includes an index, identifier of a target cell (Target Cell ID: TCI), associated with the index, and attributes for each of the target cells ("No Remove", "No HO" and "No X2"). It is noted that HO means Hand Over and X2 means an interface between base stations in LTE. Such neighbor cell list is termed a neighbor relation table (NRT). The NRT, a neighbor cell list including an index, an identifier of a target cell associated with the index (TCIs) and attributes of each target cell, as one entry, is used as part of the ANR (Automatic Neighbor Relation) function. In case a check (check mark) is inserted in "No Remove", a radio base station never deletes the cell from the neighbor cell list (delete inhibited). In case a check is inserted in "No HO", the radio base station does not use the cell in question as an object in the hand-over (use inhibited). In case a check is inserted in "No X2", X2 is not used (is not to be used) to perform specific procedures for the base station that manages the cell.

Not only the large improvement of peak throughput compared with WCDMA (Wideband Code Division Multiple Access) but also a method of improving cell edge throughput are investigated for the LTE. One of the investigations is ICIC (Inter Cell Interference Coordination).

The ICIC is a technique of exchanging information on the neighbor cells, for example, resource usage ratio and traffic load status, between the base stations, to control the radio resources, so as to reduce a neighbor cell interference. The ICIC may be said to be SON in the broad sense of the term (Non-Patent Document 1).

The investigation of LTE Advanced, in which the LTE is further advanced, is also commenced, and investigation of CoMP transmission/reception (Coordinated MultiPoint transmission and reception) is being conducted as a means for further improving the cell edge throughput.

The CoMP is a technique in which a plurality of base stations simultaneously sends down-link data to a specified terminal or simultaneously receives uplink data from a specified terminal (Non-Patent Document 3).

As regards the CoMP, a serving cell (Serving Cell), a cooperating set (CoMP cooperating set) and so forth are defined.

The serving cell is a cell that transmits control information to a terminal over a down-link control channel (PD-CCH).

The cooperating set (CoMP cooperating set) is a set of cells that directly or indirectly take part in transmitting data to a terminal over the down-link control channel (Physical Down Link Shared CHannel or PDSCH).

[NON-PATENT DOCUMENTS]
[Non-Patent Document 1] 3GPP TS36.300 v880 (Internet <URL> http://www.3gpp.org/ftp/Specs/html-info/36300.htm)
[Non-Patent Document 2] NGMN technical documents: Use Cases Related to Self Organizing Networks (Internet <URL> http://www.ngmn.org/uploads/media/NGMN_Use_Cases_Self_Organizing_Network_2_2.02.pdf)
[Non-Patent Document 3] 3GPP TR.36.814 v121 (Internet <URL> http://list.etsi.org/scripts/wa.exe.?A2=ind0907&L=3gpp_tsg_ran_wg1&T=0&O=A&P=6822
[PATENT DOCUMENT]
[Patent Document 1] JP Patent Kohyo Publication No. JP-P2000-505251A

SUMMARY

The entire contents disclosed in the Non-Patent Documents 1 to 3 and the Patent Document 1 is to be incorporated by reference into the present Application.

The following is an analysis of the related technique by the present invention.

To implement CoMP transmission/reception, it is necessary to appropriately configure a relation of a plurality of neighbor cells taking part in the CoMP transmission/reception, that is, to appropriately configure the cooperating set (CoMP cooperating set).

Moreover, to reduce OPEX (operational expenditure), it is necessary to configure automatically the cooperating set (CoMP cooperating set). This is the information obtained by the present inventor.

As a method to accomplish the above desideratum, the present inventor conducted eager researches into whether or not it is possible to automatically generate a cooperating set (CoMP cooperating set) by making use of the self-optimization method of the neighbor cell list (NRT) shown e.g., in FIG. 19. In this case, it is highly likely that, in another cell where the received power is high, or in a base station that manages such a cell, the CoMP transmitting/receiving function is not supported. Alternately, it may be expected that, even if, in another cell where the received power is high (or in a base station managing such cell), CoMP transmission/reception is supported, the transmission/reception scheme that is usable (for example, the coordinated scheduling, coordinated beam forming, joint processing, joint transmission or the like) is different. It is therefore crucial that a cooperating set (CoMP cooperating set) will be automatically generated in such a manner as not to add to the set a cell that is not in support of CoMP and/or a cell that is unable to execute CoMP transmission/reception (results of study by the present inventor).

It is therefore an object of the present invention to provide a system and a method for automatically generating a cooperating set (CoMP cooperating set) which is a set of radio stations taking part in multipoint cooperating communication or a set of cells of such radio stations, in such a manner as not to add to the set a cell that is not in support of CoMP and/or a cell that is unable to execute CoMP transmission/reception.

To accomplish the above object, the present invention provides a radio communication system, a radio communication method, a radio base station, a control station and a program that use following means.

According to the present invention, there is provided a radio communication system wherein a radio station communicates control information regarding multipoint cooperating communication, in which a plurality of radio stations take part in data transmission/reception with a terminal, with another radio station taking part in the multipoint cooperating communication and/or with a control station managing the radio station.

According to the present invention, there is also provided a radio communication method comprising:

a radio station communicating control information regarding multipoint cooperating communication, in which a plurality of radio stations take part in data transmission/reception with a terminal, with another radio station taking part in the multipoint cooperating communication and/or with a control station managing the radio station.

According to the present invention, there is also provided a radio station radio station communicating control information regarding multipoint cooperating communication, in which a plurality of radio stations take part in data transmission/reception with a terminal, with another radio station taking part in the multipoint cooperating communication and/or with a control station managing the radio station.

According to the present invention, there is also provided a control station communicating control information regarding multipoint cooperating communication, in which a plurality of radio stations take part in data transmission/reception with a terminal, with one radio station of the plurality of radio stations and/or with another radio station taking part in the multipoint cooperating communication with the one radio station.

According to the present invention, there is also provided a program causing a computer composing a radio station to execute the processing comprising:

communicating control information regarding multipoint cooperating communication, in which a plurality of radio stations take part in data transmission/reception with a terminal, with another radio station taking part in the multipoint cooperating communication and/or with a control station managing the radio station.

According to the present invention, there is also provided a program causing a computer composing a control station to execute the processing comprising:

communicating control information regarding multipoint cooperating communication, in which a plurality of radio stations take part in data transmission/reception with a terminal, with one radio station of the a plurality of radio stations and/or with another radio station taking part in the multipoint cooperating communication with the one radio station.

According to the present invention, a cooperating set, which is a set of radio stations taking part in multipoint cooperating communication or a set of cells of such radio stations, may automatically be generated in consideration of the presence/absence of the multipoint cooperating communication function in each radio station or the multipoint communication system each radio station is in support of.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 7 is a diagram showing an example of a neighbor cell list of related arts.

FIG. 8 is a diagram showing an example of a neighbor cell list according to the present invention.

FIG. 9 is a diagram showing another example of a neighbor cell list according to the present invention.

PREFERRED MODES

Figure 1:
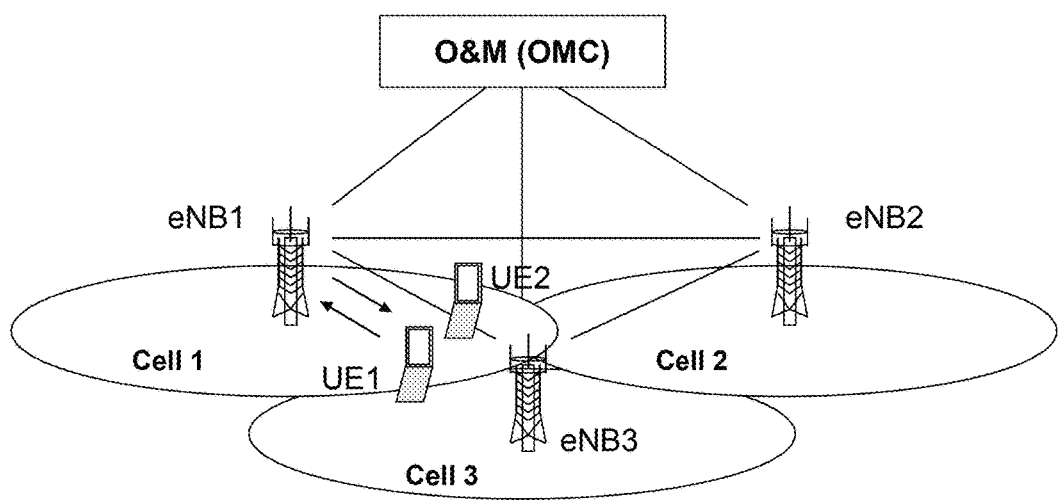
FIG. 1 is a diagram showing a configuration of a radio communication system according to an exemplary embodiment of the present invention.

The present invention will now be described in detail. Initially, as a premise of the present invention, issues that may arise in automatically generating the cooperating set by making an adaptive use of the self-optimization of the neighbor cell list will be described.

A base station has a terminal in an own cell measure a received power of a downlink signal of a neighbor cell and report information on the neighbor cell, such as Phy CID, and a measured value.

The base station then adds to the cooperating set a cell whose value of the received power reported exceeds a given threshold value and whose number of times of reports exceeds a given number.

By so doing, the cell that is capable of CoMP may appropriately be selected to enable improvement in the cell edge throughput as expected.

The above method may be said to be an appropriate method for generating the cooperating set, in which the throughput may be expected to be improved insofar as the received power at the terminal is concerned. However, there may be cases where the method is not appropriate. That is, there may be a case where the CoMP transmission/reception function is not always supported in another cell with strong received power (or a base station managing such another cell). In addition, there may be a case where, even if the CoMP transmission/reception is supported in the other cell with strong received power (or a base station managing such other cell), the transmission/reception scheme usable in such other cell differs.

According to the present invention, the base station (radio station) communicates control information regarding multipoint cooperating communication with at least one other base station taking part in the multipoint cooperating communication in which a plurality of base stations take part in data transmission/reception with a single terminal.

According to the present invention, the control information regarding multipoint cooperating communication is the information configured or retained in one or more of the multiple radio stations.

According to the present invention, one of the radio stations, to which belongs the one terminal, may communicate the control information regarding multipoint cooperating communication with another radio station.

According to the present invention, the control information regarding multipoint cooperating communication may include at least one of functional information of the multipoint cooperating communication, the configuration information of the cooperating set and the access stratum (AS) configuration information.

According to the present invention, the radio station or the control station managing the radio station, may configure the cooperating set in accordance with the control information regarding the multipoint cooperating communication, the cooperating set which is a set of the radio stations directly or indirectly taking part in the multipoint cooperating communication or a set of cells of such radio stations.

According to the present invention, the above mentioned multiple radio stations have the above mentioned multipoint cooperating transmission/reception function and control information regarding the multipoint cooperating communication may be communicated between one of the radio stations to which the one terminal belongs and which belongs to a cooperating set and neighbor radio stations, between the one radio station and a control station, or between the neighbor radio station and the control station, where the cooperating set is defined as a set of the radio stations taking part in the above mentioned multipoint cooperating communication or a set of cells of such radio stations.

According to the present invention, the control information regarding the multipoint cooperating communication may be communicated via the control station between the above mentioned one radio station and the neighbor radio station.

According to the present invention, the functional information may include information on at least one of presence/absence of the multipoint cooperating communication function and the transmission/reception scheme of the multipoint cooperating communication being supported.

According to the present invention, the configuration information may include an identifier of the cooperating set.

According to the present invention, the access stratum configuration information may include at least one of radio resource management information, terminal measurement configuration information and scheduler information.

According to the present invention, the terminal measurement configuration information may include at least one of a type (or sort) of the measurement information measured by the terminal, a period of reporting the measurement information and the event information allowing the terminal to decide whether or not the terminal is to make a report on the measurement information.

According to the present invention, a trigger for communicating the control information regarding the multipoint cooperating communication may include at least one of
  information reported by the terminal satisfying a given condition,
  establishing connection to the other radio station being about to be established or having already been newly done,
  connection to the other radio station being about to be updated or having already been updated,
  the control information having been requested from the other radio station,
  the control information having been requested from a radio station to which belongs the one terminal, and
  the control information having been requested from the control station.

According to the present invention, the above mentioned trigger may include satisfying the condition that the received quality of a neighbor cell reported by the terminal exceeds a given threshold value.

According to the present invention, a neighbor cell list indicating the relation between neighbor cells retained by the radio station and/or a control station (control station), may include, as one of attributes thereof, an attribute regarding the multipoint cooperating communication. According to the present invention, the attribute regarding the multipoint cooperating communication may include
  a flag indicating whether or not a neighbor cell belongs to the same cooperating set, and
  an identifier of the cooperating set to which belongs the neighbor cell.

According to the present invention, the radio station and/or the control station may correlate the attribute regarding the multipoint cooperating transmission/reception and the scheduler information to each other.

According to the present invention, in automated generation of the cooperating set, the cooperating set (CoMP cooperating set) is automatically generated in a manner so as not to add a cell not supporting the CoMP and/or a cell unable to execute CoMP transmission/reception to the set.

In the description to follow, it is supposed that the radio communication system is 3GPP LTE.

In the description to follow, CoMP (Coordinated Multipoint) transmission/reception is used as an example of the 'multipoint cooperating communication' by a plurality of base stations. The 'CoMP cooperating set' is used as an example of the 'cooperating set' which is a set of cells of radio base stations taking part directly or indirectly in the cooperating transmission/reception (Non-Patent Document 3).

<Configuration of First Wireless Communication System>

FIG. 1 is a diagram schematically illustrating an example of the configuration of a radio communication system according to an exemplary embodiment of the present invention. This radio communication system includes radio base stations (eNB: evolved Node B or E-UTRAN Node B (E-UTRAN: Evolved UTRAN)) eNB1, eNB2 and eNB3.

The radio communication system also includes an O&M (Operation & Maintenance Server), also termed OMC (Operation and Maintenance Center), and radio terminals (UEs) UE1 and UE2.

Figure 2:
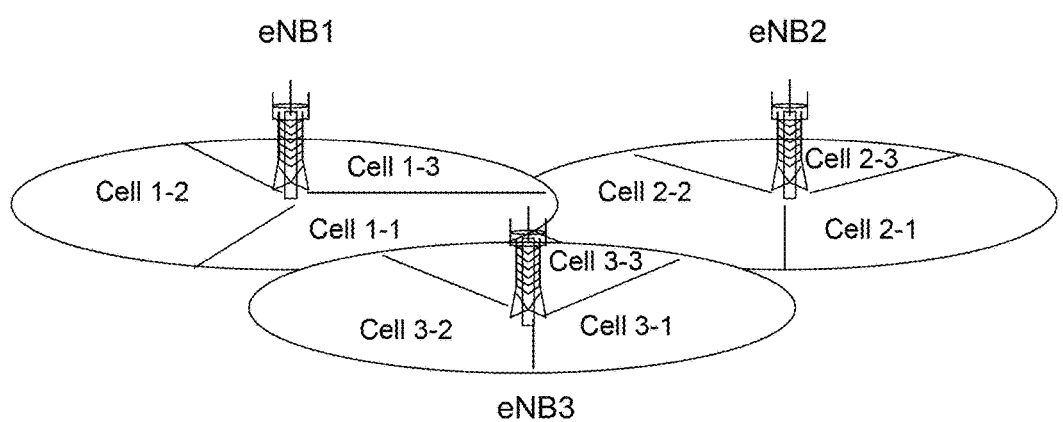
FIG. 2 is a diagram showing another cell configuration of a radio communication system according to an exemplary embodiment of the present invention.

It is assumed that the radio base stations eNB1, eNB2 and eNB3 manage a cell1 (Cell 1), a cell2 (Cell 2) and a cell3 (Cell 3), respectively. It is also assumed that, in the example shown in FIG. 1, the UE1 and the UE2 both stay in the cell1. It is noted that if the radio base stations eNB1, eNB2 and eNB3 manage a plurality of each of the sub-divided cells cell1-1 to cell1-3, cell2-1 to cell2-3 and cell3-1 to 3-3, respectively, as shown in FIG. 2, generality of the invention is not lost. That is, the present invention is applicable to the configuration of FIG. 2 as well. Here, explanation is made based on the configuration of FIG. 1, as a premise, only for the sake of simplicity. Although the present radio communication system has a preferred configuration conforming to the specifications of LTE, the present invention is not limited to this configuration.

<Exemplary Embodiment 1>

FIGS. 3 to 13 are diagrams illustrating an exemplary embodiment 1 of the present invention. It is assumed that, in the first exemplary embodiment, each of the eNB1, eNB2 has the function of CoMP transmission/reception, and that the cooperating set (CoMP cooperating set) is not configured so as to be specific to each radio terminal (UE), but so as to be specific to a cell.

Figure 3:
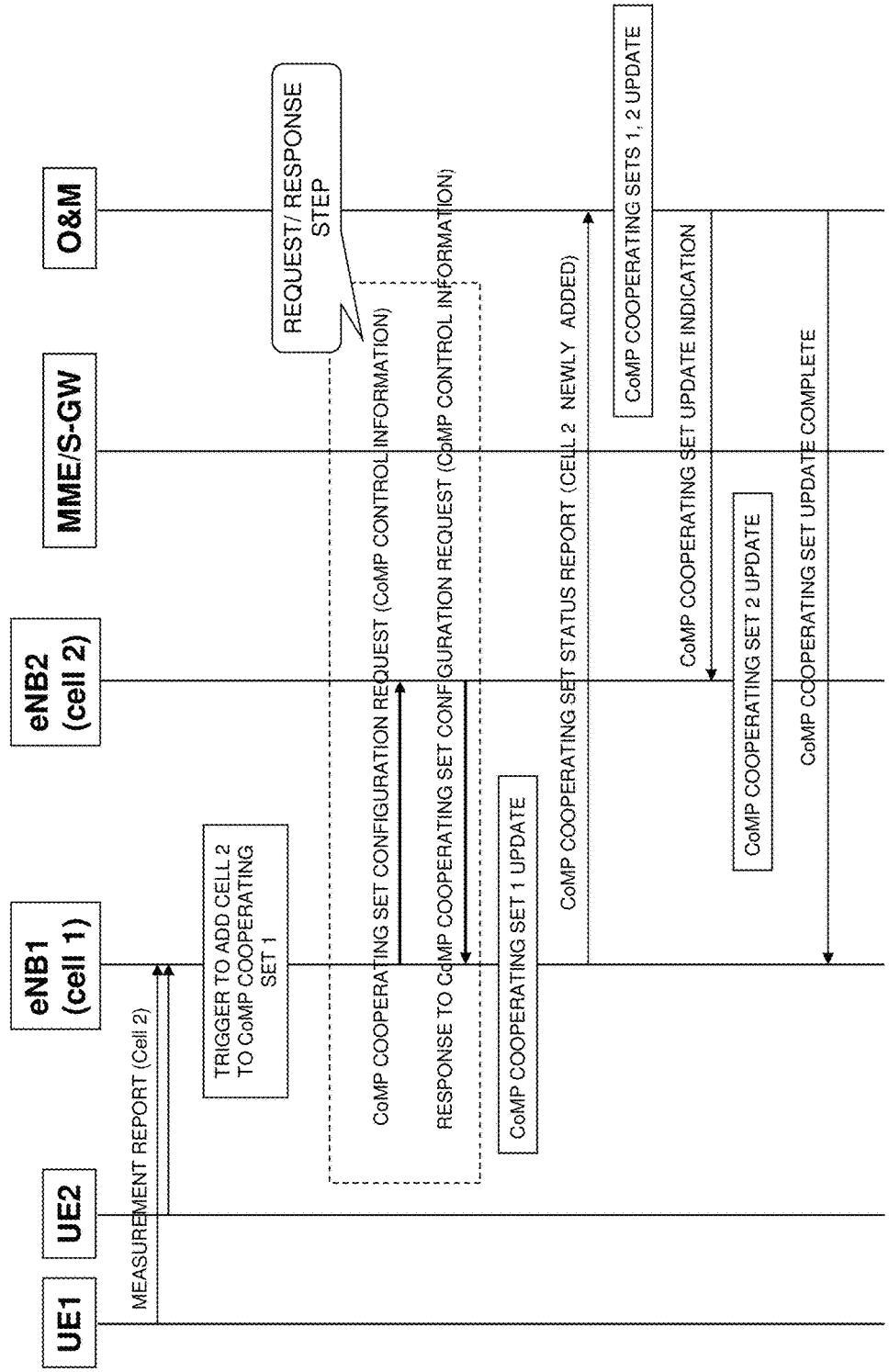
FIG. 3 is a sequence diagram for illustrating a method for configuring a cooperating set (CoMP cooperating set) according to a first exemplary embodiment of the present invention.

FIG. 3 is a sequential diagram in which the cell1 of the eNB1 and the cell2 of the eNB2 are set in the same cooperating set (CoMP cooperating set).

The eNB1 instructed the UE1 and the UE2 previously to make measurement reports on the neighbor cells (not shown in the drawing). The UE1 and the UE2 make measurement reports on the cell2 as a neighbor cell of the cell1.

In case the received quality of the downlink signal of the cell2, reported from the UE 1 and UE2, has met a given condition (for example, is greater than or equal to a given threshold value), a trigger to add the cell2 to the CoMP cooperating set1 (Trigger to add cell2 to CoMP cooperating set1) is made and the eNB1 thus proceeds to the operation of adding the cell2 to the cooperating set (CoMP cooperating set).

The eNB1 requests the eNB2 which manages the cell2, to configure the cooperating set (CoMP cooperating set), that is, makes a CoMP set configuration request, in preparation for performing CoMP transmission/reception by cooperation with the eNB1. In the present embodiment, the eNB1 notifies the eNB2, by the above request message, of the control information on CoMP (CoMP control information) that is configured in or retained by the base station.

The eNB2 has the function of CoMP transmission/reception, and makes a response (CoMP set configuration response) to the request for configuring the cooperating set (CoMP cooperating set). In this case, the eNB2 sends ACK (acknowledge response) or the equivalent information and the control information on CoMP (CoMP control information) to the eNB1 (Request/response Step).

On receiving the ACK from the eNB2, the eNB1 updates (or makes initial configuration of) the cooperating set 1 (CoMP cooperating set 1) of the eNB1 (CoMP cooperating set 1 update).

The eNB1 notifies the O&M of the update of the cooperating set 1 (CoMP cooperating set 1), that is, of the new addition of the cell2 (CoMP cooperating set status report (cell2 newly added)).

The O&M updates the information on the cooperating set (CoMP cooperating set) of the eNB1 and the eNB2 retained by the O&M (CoMP cooperating sets 1 and 2 update).

The O&M then transmits to the eNB2 an indication of updating a cooperating set 2 (CoMP cooperating set 2) retained by the eNB2 (CoMP cooperating set update indicator).

The eNB2 updates (or makes initial configuration of) the cooperating set 2 (CoMP cooperating set 2) (CoMP cooperating set 2 update).

The O&M notifies the eNB1 of the completion of update of the cooperating set (CoMP cooperating set update complete). The above completes the operation of making preparations for CoMP transmission/reception.

After completion of the update of the cooperating set (CoMP cooperating set), the eNB1 and the eNB2 decide on the UE that actually performs CoMP transmission/reception, and the configuration of the transmission/reception to perform CoMP transmission/reception.

Figure 20A:
FIGS. 20A and 20B are diagrams for illustrating an example of a change of a CoMP cell list.
Figure 20B:

FIGS. 20A and 20B are diagrams schematically illustrating how the cooperating set (CoMP cooperating set) is updated (changed) in accordance with the present exemplary embodiment. It is assumed that, if each of the eNBs includes three cells, as shown in FIG. 2, the cooperating set (CoMP cooperating set) is subjected to initial configuration by the eNB location, as shown for example in FIG. 20A. Note that, in the present exemplary embodiment, the cooperating set consists of three cells at the maximum.

In the present exemplary embodiment, the initial configuration of FIG. 20A in the cooperating set (CoMP cooperating set) is updated, as shown for example in FIG. 20B, as a more adequate cooperating set (CoMP cooperating set update), by making use of the UE's measurement report. In FIG. 20A, the number #1 of the cooperating set consists of three cells, namely the cell 1-1, cell 3-2 and the cell 3-3 of FIG. 2. However, in FIG. 20B, the number #1 of the cooperating set consists of three cells, namely the cell 1-1, cell 2-2 and the cell 3-3.

In the present exemplary embodiment, it is assumed that there is just one cooperating set (CoMP cooperating set). It is however possible that there are a plurality of cooperating sets (CoMP cooperating sets) and just one of them is configured.

It is noted that the role of the O&M in the present exemplary embodiment may be performed by an MME (Mobility Management Entity)/S-GW (Serving Gateway) or any of other network nodes.

In the present exemplary embodiment, a trigger to update the cooperating set (CoMP cooperating set) is made based on the measurement report transmitted from the UE to the eNB. It is however possible to update the cooperating set (CoMP cooperating set) using an X2 setup request as a trigger.

In short, the control information on the CoMP may be added to the X2 setup request/response (X2 set up request/response). This is effective for a case where default configuration for the cooperating set (CoMP cooperating set) is not made.

The cooperating set (CoMP cooperating set) may also be updated, using, as a trigger, the result of measurement by an eNB of the received quality of the signal received from another eNB, as the function of the UE mode implemented in e.g., a base station for home use (home base station). The UE mode herein means a mode in which a base station receives a signal sent thereto from another base station for a certain period of time.

The technique of the present invention may be applied without dependency on how to concretely execute the CoMP transmission/reception. As an example of actually performing CoMP transmission/reception, there is, for example, a centralized scheduling method in which the eNB1, for example, performs scheduling for both a UE that stays in the cell1 and a UE that stays in the cell2 managed by the eNB2.

In this case, the eNB1 performs scheduling not only of the UE performing CoMP transmission/reception but also of the UE performing the usual transmission/reception.

There is also a distributed scheduling in which the eNB1 schedules the UE that stays in the cell1, the eNB2 schedules the UE that stays in the cell2, and the eNB1 and the eNB2 negotiate with each other as to the scheduling of the UE to determine whether or not the CoMP transmission/reception is able to be performed.

In this case, the scheduling for CoMP transmission/reception of the UE that stays in the cell 1 is notified from the eNB1 to the eNB2, and the eNB2 determines whether or not the scheduling is acceptable.

In the control information on the CoMP (CoMP control information), transmitted between the radio base stations (eNB1 and eNB2), the information on whether or not the function of CoMP transmission/reception is equipped is the necessary minimum information.

The information on whether or not the function of CoMP transmission/reception is equipped is the information by which to confirm whether or not each radio base station (eNB) has the function of CoMP transmission/reception. It is apparent that the eNB which is a transmission source of the request for configuring the cooperating set basically has the CoMP transmitting/receiving function. Thus, when replying a response, the eNB, which is a transmission destination of the CoMP control information, transmits to the eNB of the transmission source the information as to whether or not the replying eNB has the CoMP transmission/reception function.

In the present exemplary embodiment, each of the eNB1 and eNB2 has the CoMP transmission/reception function.

Therefore, the eNB2 notifies to the eNB1 the information (e.g., a flag) indicating that the eNB2 has the CoMP transmission/reception function.

Or, the eNB2 may send an acknowledge response (ACK) to the eNB1 to indicate that the eNB2 has the CoMP transmission/reception function.

In order to more appropriately configure the cooperating set (CoMP cooperating set), such information as
- the information on the CoMP transmission/reception scheme being supported, or
- the information on whether or not CoMP may be accepted may be notified in addition to the information as to whether or not the CoMP transmission/reception function is equipped.

As regards the CoMP transmission/reception scheme being supported, the eNB1 initially notifies the eNB2 of the CoMP transmission/reception scheme that the eNB1 supports. In response thereto, the eNB2 notifies the eNB1 of the CoMP transmission/reception scheme that the eNB2 supports.

Or, the eNB1 may notify the eNB2 of the CoMP transmission/reception scheme that the eNB1 supports and the eNB2 then notifies to the eNB1 whether or not the eNB2 supports respective functions supported by the eNB1.

There may arise such a situation in which radio base stations, each having the CoMP function, but supporting just different CoMP transmission/reception schemes, are added to the same cooperating set (CoMP cooperating set), resulting in the cooperating set not functioning as intended. Such situation may be avoided by the configuration of the present exemplary embodiment.

The information on whether or not CoMP transmission/reception may be accepted is the information on whether or not the radio base station that has received CoMP set configuration request is able to accept such request. A flag, for example, may be used to indicate whether or not the radio base station is able to accept the request.

A timeout value of a timer indicating the prospective time during which the request in question is unable to be accepted, or a timer used in case the request in question is unable to be accepted, may be notified. An operation employing a timer may be such a one, shown in FIG. 4, in which a radio base station has sent a cooperating set configuration request (CoMP set configuration request) and received the timeout value of a timer causes its timer to be started. After the timer has expired, the radio base station may again carry out the processing of making the cooperating set configuration request.

Another example operation may be such a one in which the radio base station that received the cooperating set configuration request, (that set the timer), decides, after the timer expired, whether or not it is able to accept the request again.
- In case the radio base station is able to accept the CoMP transmission/reception, the radio base station may notify the radio base station that transmitted the cooperating set configuration request (CoMP set configuration request) of the fact that the request may be accepted.
- In case the radio base station is unable to accept the CoMP transmission/reception, the radio base station may notify the radio base station that transmitted the cooperating set configuration request (CoMP set configuration request) of the timeout value of the timer or of the re-start of the timer.

As yet another example operation, if the radio base station that has received the request is able to accept the CoMP transmission/reception before the timer times out, it may send a notification that it is able to accept CoMP transmission/reception without waiting for the expiration of the timer.

In this manner, it is possible to prevent a radio base station as a source of transmission of the cooperating set configuration request from continuing to transmit the request even though the radio base station as a destination of transmission is unable to accept CoMP transmission/reception. It is thus possible to prevent exchanging wasteful information between radio base stations.

As extensions of the CoMP control information that are exchanged between different radio base stations and that are needed in order to configure more appropriately the cooperating set (CoMP cooperating set), there are
- functional information of CoMP transmission/reception;
- configuration information of the cooperating set (CoMP cooperating set);
- access stratum (AS) configuration information, and so forth.

As the functional information of CoMP transmission/reception, there are
- presence/absence of the functions of CoMP transmission/reception; and
- a CoMP transmission/reception scheme being supported.

As the configuration information of the cooperating set (CoMP cooperating set), there are
- an identifier of the cooperating set (CoMP cooperating set); and
- the information of other cells belonging to the same cooperating set (CoMP cooperating set).

The identifier of the cooperating set is used to show which of cooperating sets is relevant in case a plurality of the cooperating sets have been configured for a single base station. The information of other cells belonging to the same cooperating set is used to indicate which of the other cells cooperates (or likely to cooperate). The above listed configuration information may be used in case a plurality of cooperating sets has been configured in order to select a appropriate one of the sets.

As the access stratum (AS) configuration information, there are
- radio resource management information;
- terminal measurement configuration information; and
- scheduler information.

The radio resource management information is the information actually needed to execute CoMP transmission/reception, and may, for example, be
- traffic information; and
- information as to whether or not CoMP transmission/reception maybe accepted.

The traffic information is the information for the traffic volume or value of each cell. The traffic information may be the traffic amount or its quantized value, per se, or a level determined based on several predefined threshold values.

Or, the traffic information may simply be a flag indicating whether the traffic volume is greater (or smaller) than a given threshold value.

It is noted that the traffic volume may be the number of the active terminals of each cell, usage rate of the radio resources (for example, usage rate per PRB (Physical Resource Block)), H/W (hardware) usage rate, and load on the network (TNL (Transport Network Layer) Load). The above listed traffic information may be used, for example, to determine with which cell the CoMP transmission/reception is to be performed for improvement of efficiency.

Or, the estimation may be made of the number of terminals that are capable or prospectively capable of performing CoMP transmission/reception and the estimation result may be used to determine the range of execution of the CoMP transmission/reception (physical locations of terminals, threshold values of the received quality of the signal sent to the terminal from the neighbor cell, or the like).

The terminal measurement configuration information is the information that is needed in performing CoMP transmission/reception and that a terminal has to report to a radio base station. The terminal measurement configuration information includes:

a type of measurement information the terminal has to measure;
a period of reporting of the measurement information; and
event information to which a terminal may refer to in deciding whether or not the measurement report is to be made.

As the type of the measurement information, there are
received power of a downlink reference signal (pilot signal) (RSRP: Reference Signal Received Power);
received quality (RSRQ: Reference Signal Received Quality or CQI: Channel Quality Indicator);
information on whether the measurement is for the entire system bands or for only a specified band;
information on whether the measurement is of specified values on per bands, for the entire system bands; and so forth.

The period of reporting of measurement information may, for example, be once per 100 msec and, in case there are a plurality of types of the measurement information, the reporting period may be independently configured for each of the types of the measurement information.

The event information is the information for events which may prompt a terminal to make measurement reports. The event information may include
a condition for determination (types of event);
a threshold value used in the event;
an offset value used in the event; and so forth.
As the event, the following may be used
an event used for handover or the like already specified in 3GPP LTE, or
another event specifically defined for CoMP.
Among the events used for e.g., handover, there are
an event A1: The quality of a serving cell has become better than a given threshold value (Serving cell becomes better than threshold);
an event A2: The quality of a serving cell has become worse than a given threshold value (Serving cell becomes worse than threshold);
an event A3: The quality of a neighbor cell has become better than that of a serving cell by a value equal to a given offset (Neighbor becomes offset better than serving cell);
an event A4: The quality of a neighbor cell has become better by more than a given offset (Neighbor becomes better than threshold);
an event A5: The quality of a serving cell has become worse by more than a given threshold 1 and the quality of the neighbor cell has become better by more than a given threshold 2 (Serving cell becomes worse than threshold 1 and neighbor becomes better than threshold 2).
A particular event for CoMP may include
a quality of the serving cell being better than a given threshold as well as;
a quality of the neighbor cell being better than that of the serving cell added by a value equal to a given offset (positive or negative); and so forth The threshold or offset values are exchanged between radio base stations, more precisely, a radio base station that is a source of transmission of the cooperating set configuration request (CoMP set configuration request) notifies a radio base station that is a destination of transmission of threshold or offset values. The radio base station that is the source of transmission allows (or force) the radio base station that is the destination of transmission to use the threshold or offset values. It is thus possible to avoid a deviation in the number of terminals taking part in the CoMP transmission/reception among cells in the same cooperating set (CoMP cooperating set). For example, if a threshold value for decision in a certain cell A is lower than that in another cell B, a decision tends to be given that a terminal that stays in the cell A is more liable to perform CoMP than a terminal that stays in the cell B. Therefore, it may be anticipated that the number of terminals taking part in the CoMP transmission/reception has a deviation among cells. In the present exemplary embodiment, in which the cells share e.g., the event-related information for having the terminals make measurement reports, it is possible to avoid deviation in the number of terminals taking part in the CoMP transmission/reception among cells.

Or, in the present exemplary embodiment, the threshold value or the offset value may be corrected among radio base stations by taking into account the cell deployment.

Since the radio base stations share the measurement information, obtained by the terminals, the information of the same type may be used by the cells within the same cooperating set (CoMP cooperating set) to decide whether or not CoMP transmission/reception is to be performed.

The scheduler information is the information for terminal scheduling in the radio base stations taking part in the CoMP transmission/reception. The scheduler information includes a scheduler policy and a scheduler type. The scheduler policy indicates one of
a Round-Robin (RR) method;
a Proportional Fairness (PF) method; and
a Maximum C/I (MAX C/I) method.
The scheduler type indicates whether scheduling is centralized scheduling or distributed scheduling.
In the case of the centralized scheduling, there is further included the information as to which radio base station is to perform the scheduling.

By introducing the sharing of the scheduler information among the radio base stations, the necessary information may be intensively collected at a suitable location in the case of the centralized scheduling. In the case of the distributed scheduling, the scheduling may be made between cells within the same cooperating set (CoMP cooperating set) based on the same policy.

By the above technique, it is possible with the present exemplary embodiment to automatically and optimally configure the cooperating set (CoMP cooperating set).

In the above description of the present exemplary embodiment, it is assumed that the control information on CoMP (CoMP control information) has been configured in the base station or retained by the base station. However, the control information may be other information which is dynamically changed.

It is noted that, in FIG. 3, the control information on CoMP (CoMP control information) is transmitted included in a message of the cooperating set configuration request/response (CoMP set configuration request/response), only by way of illustration and it is as a matter of course that the embodiment is not limited to this configuration. Initially, a part of the control information on CoMP may be transmitted as cooperating set configuration request/response (CoMP set configuration request/response) by way of performing a step of transmitting the partial CoMP control information. The remaining control information on CoMP (Remaining CoMP control information) may then be transmitted in case the cooperating set configuration request/response (CoMP set configuration response) is an acknowledge response (ACK).

Or, the step of the cooperating set configuration request/response (CoMP set configuration request/response) is initially performed. The control information on CoMP may then be transmitted in case the cooperating set configuration response (CoMP set configuration response) is an acknowledge response (ACK).

The control information on CoMP, transmitted by the base station (eNB1), transmitting the cooperating set configuration request (CoMP set configuration request), does not have to be the same as the control information on CoMP transmitted by the base station (eNB2) returning a response (CoMP set configuration response). It is sufficient that the base station (eNB1) and the base station (eNB2) send just the information needed by the respective destinations of transmission. It is also possible for the base station (eNB1) transmitting the cooperating set configuration request (CoMP set configuration request) to transmit just a request message, in which case the CoMP control information is transmitted just by the base station (eNB2) returning the response (CoMP set configuration response). In this case, the request message from the eNB1 becomes a trigger for the eNB2 to transmit the CoMP control information.

Figure 4:
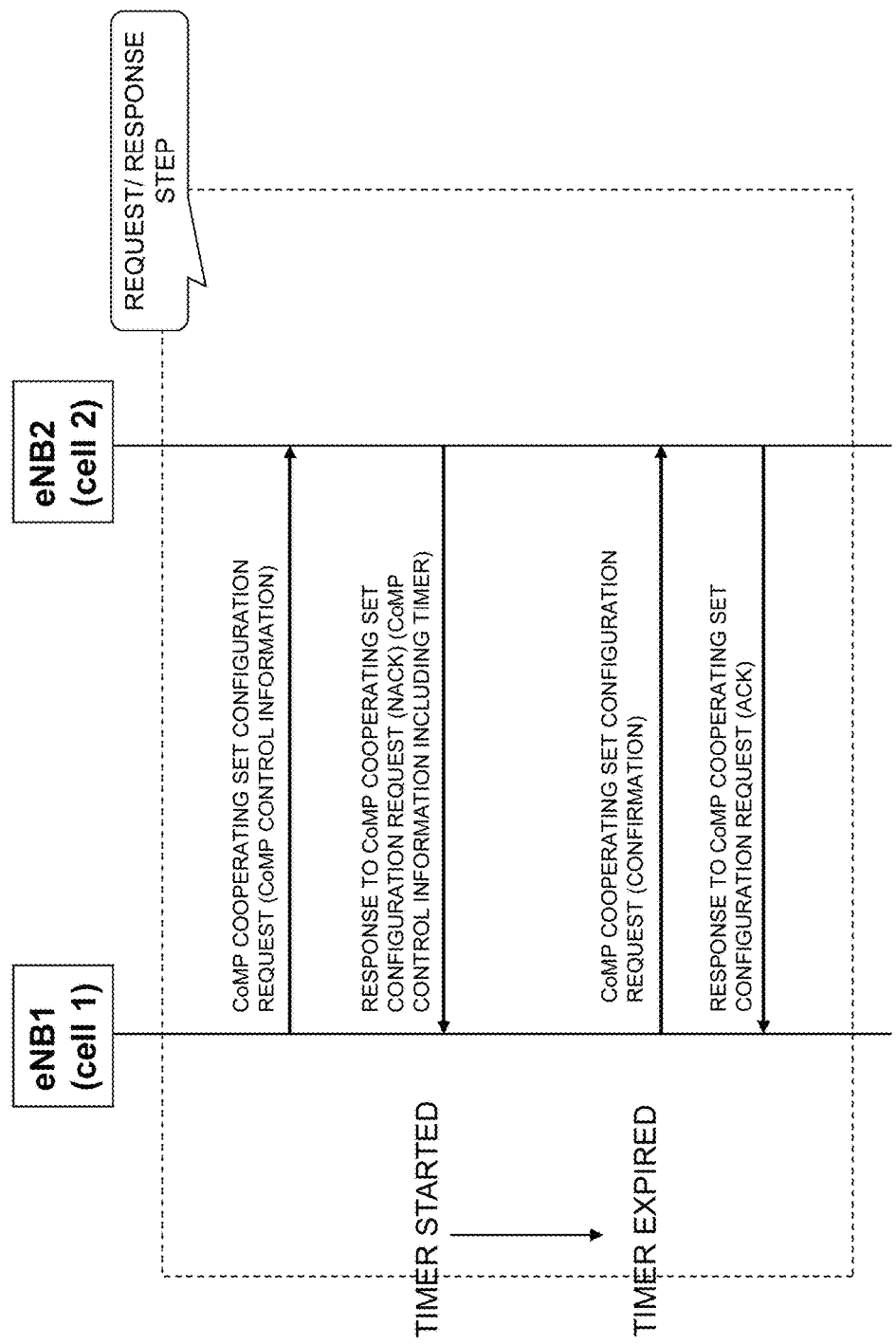
FIG. 4 is a diagram illustrating timer control in the configuration of the cooperating set (CoMP cooperating set) according to the first exemplary embodiment of the present invention.
Figure 5:
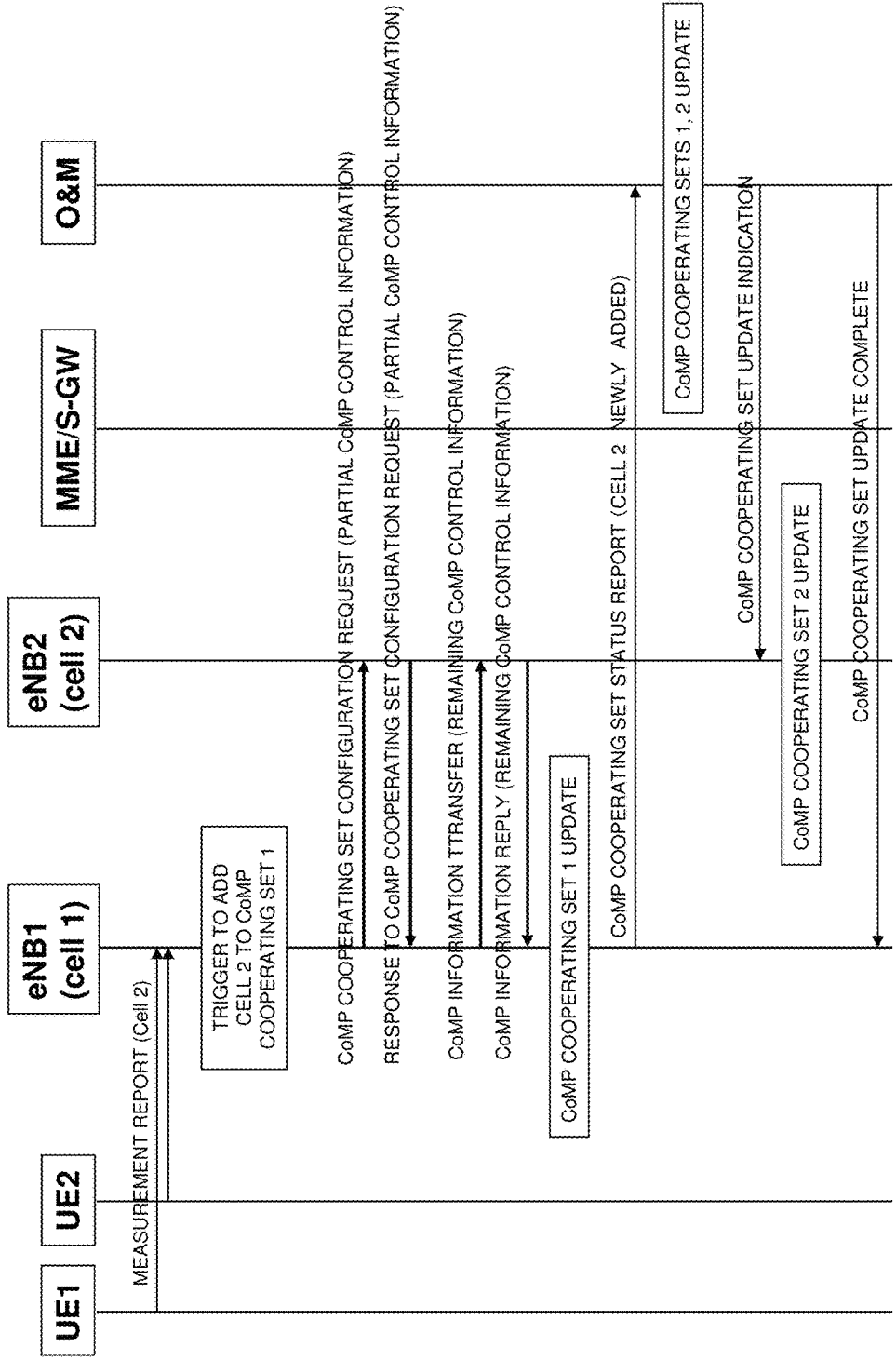
FIG. 5 is another sequence diagram for illustrating a method for configuring a cooperating set (CoMP cooperating set) according to the first exemplary embodiment of the present invention.

Regarding the processing of FIG. 5, when a radio base station that has transmitted the cooperating set configuration request (CoMP set configuration request), shown in FIG. 4, is notified of a timeout value of a timer, the radio base station may start its timer. After expiration of the timer, the radio base station may again transmit the cooperating set configuration request.

Figure 6:
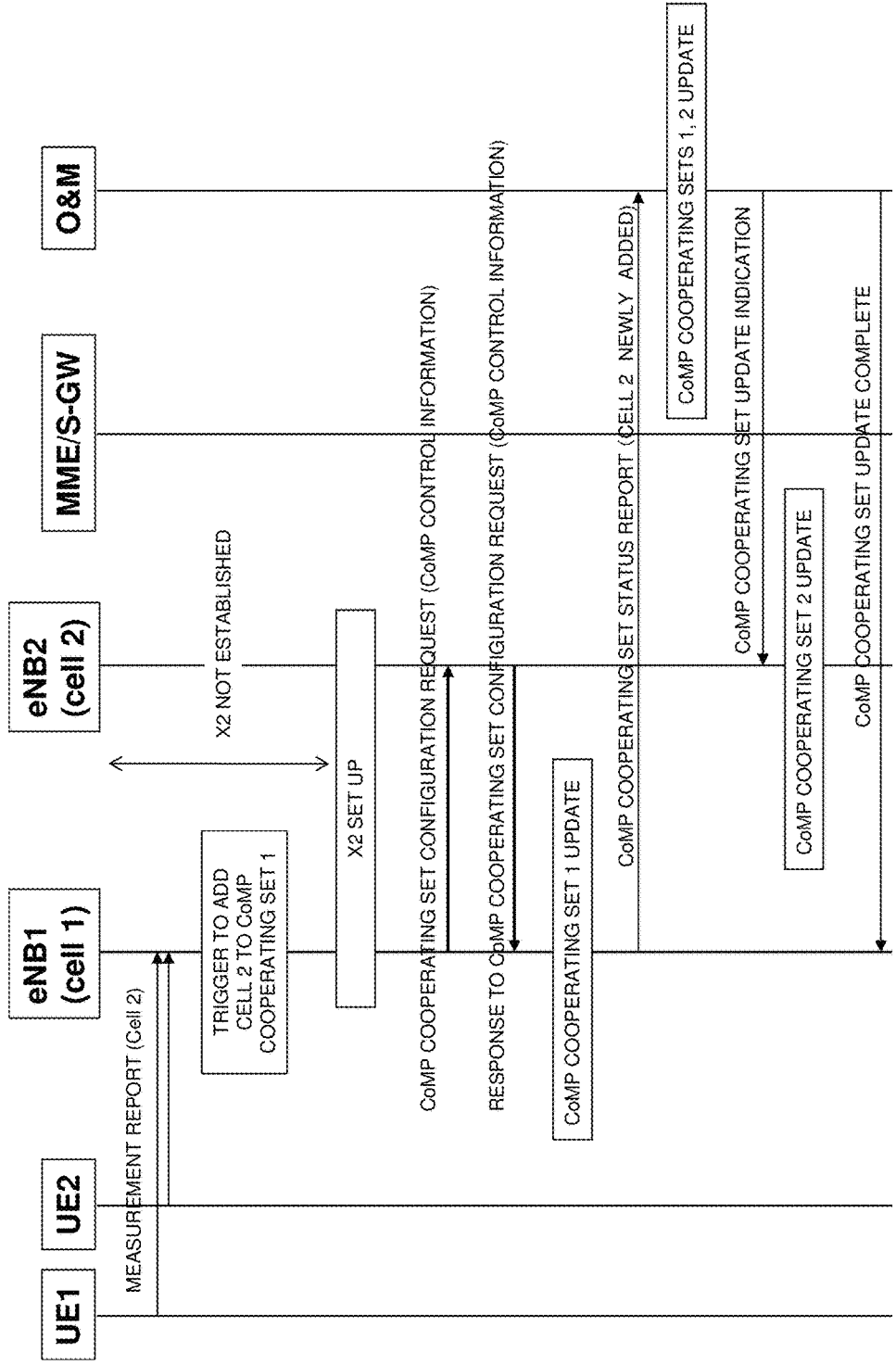
FIG. 6 is yet another sequence diagram for illustrating a method for configuring a cooperating set (CoMP cooperating set) according to the first exemplary embodiment of the present invention.

If connection (X2) has not been set up between the eNB1 and the eNB2, as shown in FIG. 6, X2 connection is initially set up (X2 setup) before making the cooperating set configuration request (CoMP set configuration request). Thereafter, the processing similar to that shown in FIG. 3 or 5 is performed.

The information on the cooperating set configuration request (CoMP set configuration request) or the CoMP control information may be transmitted simultaneously or multiplexed (piggy backed) with the information necessary for normal X2 setup.

The control information on CoMP (CoMP control information) may include different information between an eNB that is a source of transmission of a cooperating set configuration request (CoMP set configuration request) and another eNB that is a destination of transmission of the a cooperating set configuration request. There may further be such a case where the eNB that is a source of transmission sends a message indicating just the cooperating set configuration request, but the eNB that is a destination of transmission returns a response (ACK) to the request and the detailed control information on CoMP.

The radio base station which transmitted the cooperating set configuration request (CoMP set configuration request) shown in FIG. 4 and informed of a timeout value of a timer may then start its timer. After expiration of the timer, the radio base station may again perform the processing of the cooperating set configuration request (request).

Moreover, in case an event of the measurement report for CoMP is prescribed as described above, the terminal location information (for example, a location information acquisition result by GPS (Global Positioning System)), may be added to the measurement report for the relevant event, and the so formed measurement report may then be notified.

If the event is for handover, that is, the event is not that of the report of measurement specific to CoMP, and the base station has given an instruction to make notification of the location information, such as by a flag, the terminal may report the location information to the base station.

The terminal location information may presumably be used for configuring a cooperating set (CoMP cooperating set);

a CoMP transmission point; or the like.

By using the terminal location information, it is possible, in case there are a plurality of candidate cooperating sets (CoMP cooperating sets), to select a appropriate one of the sets. It is moreover possible to select, from among the cooperating sets (CoMP cooperating sets), a CoMP transmission point that actually performs transmission.

Investigations will now be made into the relationship between the NRT (Neighbor Relation Table) in the ANR (Automatic Neighbor Relation) function provided in 3GPP LTE and the cooperating set (CoMP cooperating set).

An objective of generating an NRT is to appropriately identify a neighbor cell whose received quality is good among cells other than the serving cell to thereby reduce the handover failure ratio. In the NRT, attributes such as "No Remove", "No X2" or "No HO" are set on a per cell basis.

On the other hand, an objective of configuring the cooperating set (CoMP cooperating set) is to identify a neighbor cell, having a good received quality among cells other than a serving cell and to improve characteristics of a radio link, such as throughput, by executing cooperating transmission/reception, that is, CoMP transmission/reception, from a plurality of base stations, managing the relevant cell.

There is thus a correlation relationship between the cell added to the NRT and the cell added to the cooperating set (CoMP cooperating set). Thus, by adding the attribute(s) of the cooperating set (CoMP cooperating set) to the NRT, it is thought possible to perform uniform management of the neighbor cell relation.

By way of adding the attribute(s) of the cooperating set (CoMP cooperating set) to the NRT, a check column may simply be added to indicate as to whether or not each cell belongs to the same cooperating set (CoMP cooperating set), as shown for example in FIG. 8. It is seen that, in FIG. 8, a column of 'CoMP' is provided as an attribute in addition to attributes of No Remove, No X2 or No HO. Note that a checked (check-marked) cell belongs to the cooperating set (CoMP cooperating set).

If there are a plurality of cooperating sets (CoMP cooperating sets), serial numbers of the cooperating sets, such as #1, #2 and so forth, may be appended as identifiers to indicate to which serial number set each cell belongs.

It is noted that the method of management by appending serial numbers of the cooperating sets (CoMP cooperating sets) is effective for a case where the configuration of the cooperating set (CoMP cooperating set) is changed or has to be changed with the lapse of time, as shown in FIGS. 10(A) and 10(B).

It is supposed that the radio base station of interest is a radio base station 1 managing the cells 1-1 to 1-3 and CoMP is for a terminal that stays in the cell 1-1.

A set #1 of the cooperating sets (CoMP cooperating sets) includes cells 1-1, 2-3 and 3-2 (FIG. 10(A)). A set #2 contains cells 1-2, 3-3 and 4-2 (FIG. 10(B)).

At a specific time point, the set #1 is configured, and CoMP transmission/reception for a terminal is performed among cells included in the set #1.

If, at another specific time point, the set 1 is changed to the set #2, and then CoMP transmission/reception for the terminal is going on, among cells included in the set #2.

Among the factors that cause the change with time of the configuration of the cooperating set (CoMP cooperating set), there is, for example, the traffic volume or value (Loading) in each cell or in each cooperating set (CoMP cooperating set).

Thus, to keep loading in the cooperating set (CoMP cooperating set) as uniform as possible, switching control (semi-static switching) of the cooperating set is performed. Such control is desirably executed by O&M, but not limited to O&M, and may be executed by, for example, a specific radio base station.

Figure 10:
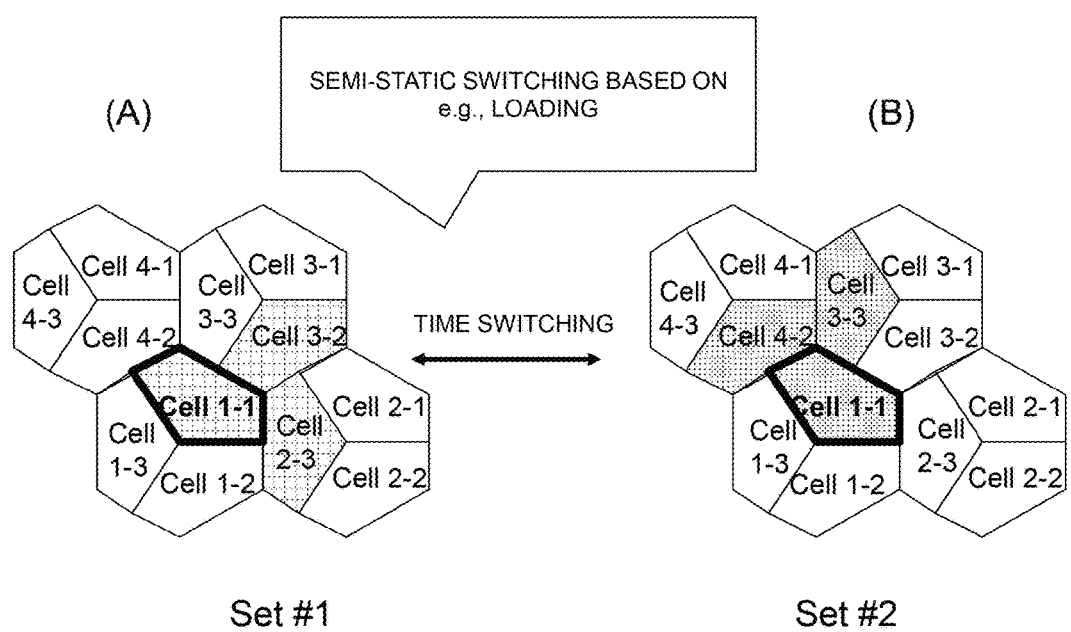
FIG. 10 is a diagram showing an example of a cooperating set (CoMP cooperating set) according to the present invention.
Figure 11:
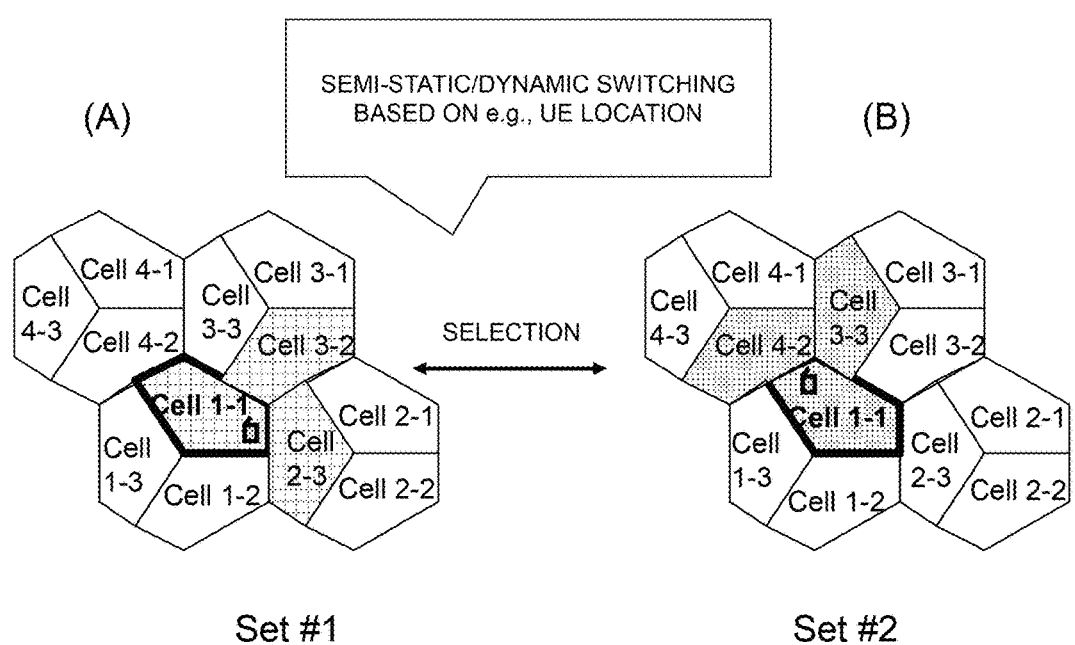
FIG. 11 is a diagram showing another example of a cooperating set (CoMP cooperating set) according to the present invention.

There are cases wherein, in place of the switching with time, as shown in FIG. 10, a plurality of cooperating sets (CoMP cooperating sets) are configured simultaneously, as shown in FIG. 11 (One of the cooperating sets is selected).

In the example shown in FIG. 11, a specific set is selected out of a plurality of cooperating sets (CoMP cooperating sets), depending on the location of the terminal, even in the same cell (cell1-1).

In case the terminal is located at a right edge in the cell1-1, as shown in FIG. 11(A), the set #1 is used. In case the terminal is located at a left edge in the cell1-1, as shown in FIG. 11(B), the set #2 is used.

By so doing, switching may be made to an optimum cooperating set (CoMP cooperating set) depending on the location of the terminal in the cell, even if the cell is the same cell1-1, thus maximizing the gain by CoMP transmission/reception.

The information on the terminal location may be one obtained by the GPS, as mentioned previously, or may be determined by the base station from the measurement reports for the neighbor cells.

It may be thought that there are cases where addition to the cooperating set (CoMP cooperating set) may have a meaning different from that in the case of addition to the neighbor cell list.

An objective of the neighbor cell list is to add a cell, to which handover of a terminal is most likely to occur (as long as the number of the cells that may be added is not exceeded), with omission as little as possible. By so doing, terminal movement should be managed appropriately.

On the other hand, in the cooperating set (CoMP cooperating set), handover is not necessarily a matter of concern. For example, such a cell for which handover is unlikely to occur, given its particular site location, may be added advantageously to the cooperating set (CoMP cooperating set), if the reception level is of a given level.

It is noted that not only cells of radio base stations connected to the same MME/S-GW but cells of radio base stations connected to a different MME/S-GW may be added to the neighbor cell list as described above.

On the other hand, it may be thought that just the cells of the radio base stations, connected to the same MME/S-GW, may be members of the cooperating set (CoMP cooperating set), from the processing delay point of view. By so doing, the gain by the CoMP may preferably be maximized.

That is, there is a method in which just cells of radio base stations connected to the same MME/S-GW are cells that can be added to the same cooperating set (CoMP cooperating set) and cells except the above cells, that is, cells of radio base stations connected to different MME/S-GW, cannot be added.

By configuring the relationship between the neighbor cell list and the cooperating set (CoMP cooperating set), as the foregoing is taken into account, the cooperating set (CoMP cooperating set) may be configured more appropriately.

Figure 12:
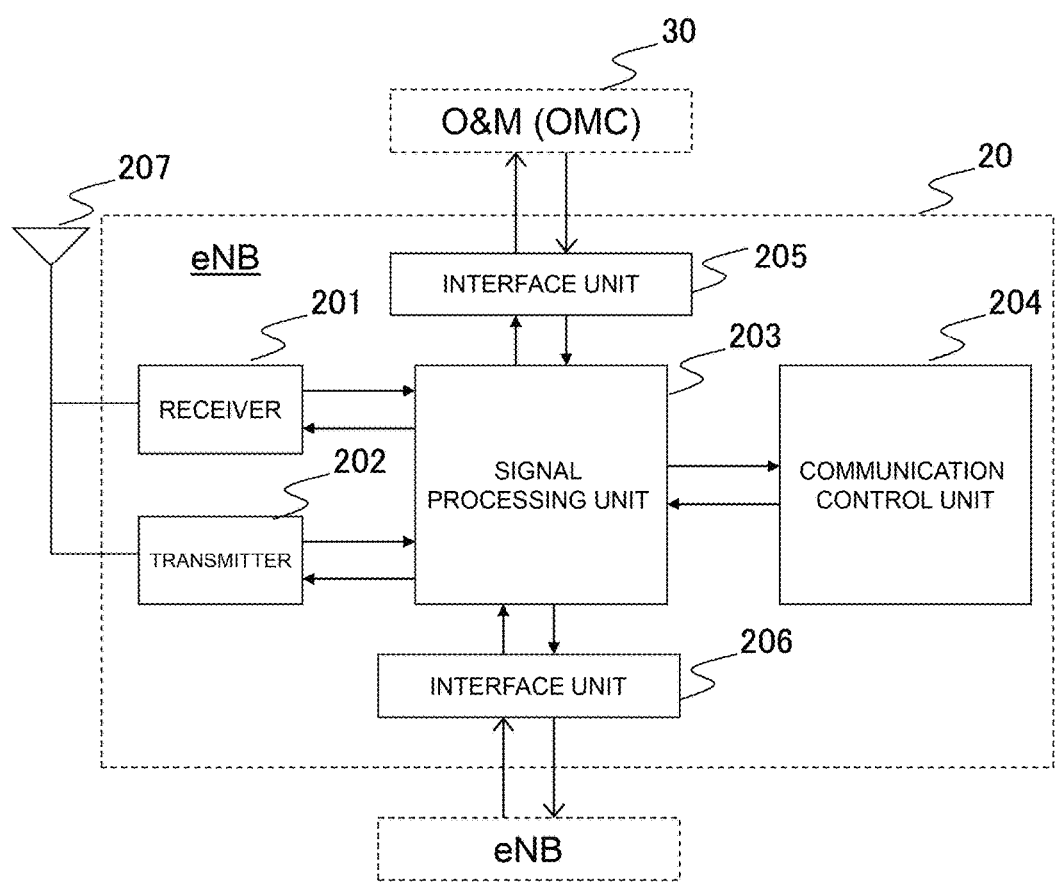
FIG. 12 is a block diagram showing a configuration of a radio base station (eNB) according to the present invention.

FIG. 12 is a diagram showing an arrangement of a radio base station (eNB) in the present exemplary embodiment. Referring to FIG. 12, a radio base station eNB20 includes a receiver 201 connected to an antenna 207, a transmitter 202, similarly connected to the antenna 207, a signal processing unit 203, a communication control unit 204 and an interface unit 205 with an O&M (OMC) 30. In addition, the radio base station includes an interface unit (X2 interface) 206 with other eNBs.

The receiver 201 receives a signal from a terminal and the transmitter 202 transmits a signal to the terminal. The signal processing unit 203 takes charge of signal processing between the radio base station and the terminal, that between the radio base station and another radio base station, and that between the radio base station and the O&M 30. The communication control unit 204 controls the signal transmission/reception between the base station and a terminal, between the base station and other radio base stations and between the base station and the O&M. It is the communication control unit 204 that controls the transmission/reception of the cooperating set configuration request/response with regard to CoMP and the control information on CoMP. It is again the communication control unit 204 that manages the cooperating set (CoMP cooperating set) as held by the radio base station (eNB).

Figure 13:
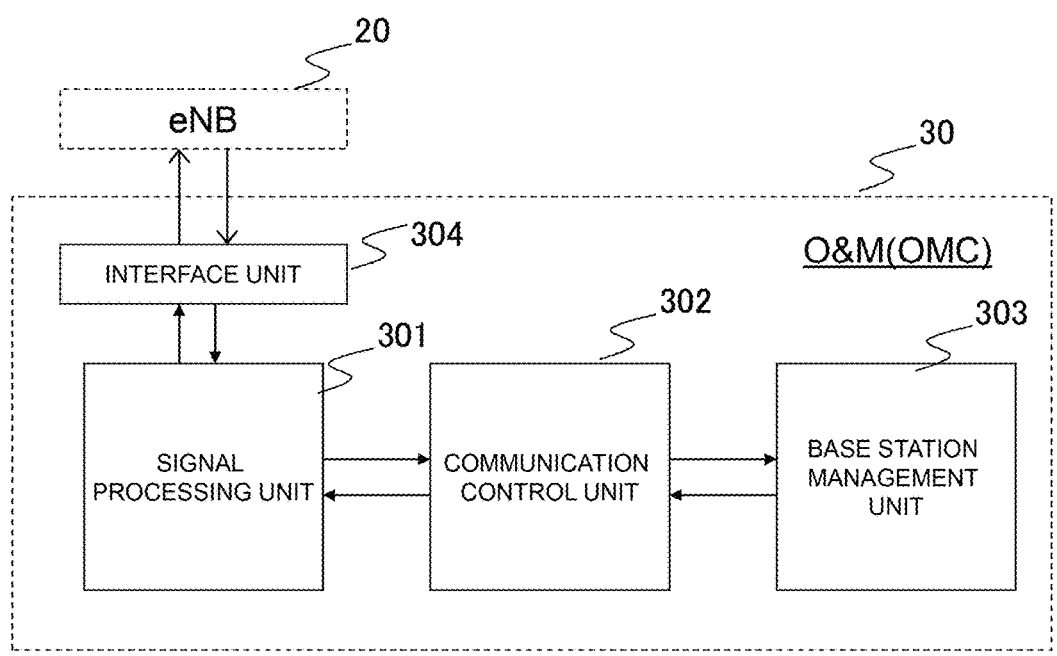
FIG. 13 is a block diagram showing a configuration of a control station (O&M) according to the present invention.

FIG. 13 is a diagram showing an arrangement of the configuration of the control station (O&M) in the present exemplary embodiment. Referring to FIG. 13, the O&M 30 includes a signal processing unit 301, a communication control unit 302, a base station management unit 303 and an interface unit 304 for interfacing with the base stations. The signal processing unit 301 takes charge of signal processing between it and the radio base stations. The communication control unit 302 controls which signals are to be sent and received between the O&M 30 and the radio base stations, while controlling the transmission/reception of the CoMP control information according to the present invention. The base station management unit 303 manages the configuration information of the base stations the O&M 30 takes charge of, while also managing the information on the neighbor relation and the information on the cooperating set (CoMP cooperating set).

<Modification of the Exemplary Embodiment 1>

In a modification of the first exemplary embodiment of the present invention, it is assumed that eNB1 and eNB3 both have the CoMP transmission/reception function, while the eNB2 does not have such function. It is also assumed that the result of quality measurements for the cell2 and cell3 by UE1 and UE2 that stay in the cell1 of the eNB1, and the cell2 is better in quality than the cell3.

Figure 14:
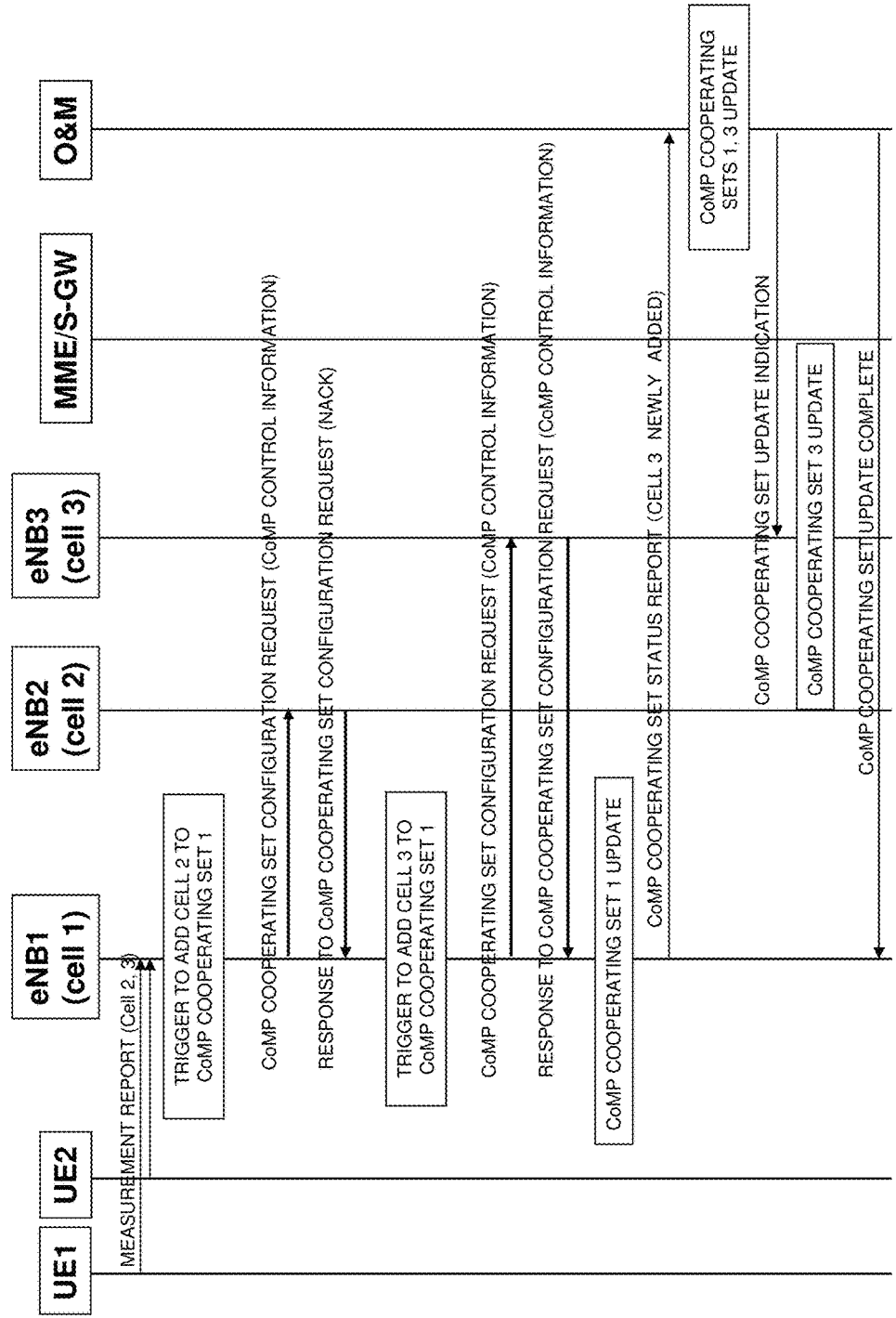
FIG. 14 is a sequence diagram for illustrating a method for configuring a cooperating set (CoMP cooperating set) according to a modification of the first exemplary embodiment of the present invention.

FIG. 14 is a diagram showing a sequential operation in case the cell1 of eNB1 and the cell3 of eNB3 are set in the same cooperating set (CoMP cooperating set).

The eNB1 instructed the UE1 and the UE2 to make measurement reports of the neighbor cells, previously (not shown). The UE1 and the UE2 make measurement reports on the cells 2 and 3 as neighbor cells for the eNB1.

It is assumed that the received quality of a downlink signal in the cell2, reported by the UE1 and the UE2, is better than that in the cell3, and has met a given condition (for example, is higher than a given threshold value). In this case, the eNB1 commences its operation to add the cell2 to the cooperating set (CoMP cooperating set) (Trigger to add cell2 to CoMP cooperating set 1).

Initially, the eNB1 transmits to the eNB2 that manages the cell2, the control information for CoMP (CoMP control information) in a message of the cooperating set configuration request (CoMP set configuration request).

However, the eNB2 does not have the CoMP transmission/reception function. The eNB2 thus transmits a negative acknowledge response (NAK or equivalent information) as a response (CoMP set configuration response) to the cooperating set configuration request.

In this case, the eNB1 decides whether or not a cell3, reported to be of good quality in addition to the cell2 (for example, next to the cell2), satisfies a given condition. If the cell3 satisfies the given condition, the eNB1 commences its operation to add the cell3 to the cooperating set (CoMP cooperating set) (Trigger to add cell3 to CoMP cooperating set 1). This operation is similar to that for the eNB2.

It is thus initially checked whether or not the eNB3 has the CoMP transmission/reception function. In case the eNB3 has the CoMP transmission/reception function, the eNB1 receives the CoMP control information from the eNB3 to update (or performs initial configuration of) the cooperating set (CoMP cooperating set), while also notifying the O&M of the update of the cooperating set (CoMP cooperating set status report (cell3 newly added)).

The O&M then instructs the eNB3 to update a cooperating set 3 (CoMP cooperating set 3) (CoMP cooperating set update indication). The eNB3 updates or initializes the update cooperating set 3 (CoMP cooperating set 3) (CoMP cooperating set 3 update).

The O&M notifies the eNB1 of completion of the update of the cooperating set (CoMP cooperating set) (CoMP cooperating set update complete) and the operation for making preparations for CoMP transmission/reception is completed.

After the completion of update of the cooperating set (CoMP cooperating set), the eNB1 and the eNB3 determine the UE that actually takes charge of CoMP transmission/reception and the transmission/reception configuration to perform CoMP transmission/reception.

Here, the control information on CoMP (CoMP control information) is notified in a message of the cooperating set configuration request (CoMP cooperating set configuration request). It is however also possible to initially perform the step of communicating just the control information on CoMP necessary for the cooperating set configuration request/response (CoMP set configuration request/response). In case the cooperating set configuration response (CoMP set configuration response) is an acknowledge response (ACK), the remaining necessary portion of the control information on CoMP (CoMP control information) may then be communicated.

Moreover, the base station (eNB1), transmitting the cooperating set configuration request (CoMP set configuration request), may transmit just the request message, while the control information for CoMP may be transmitted just by the base station that returns a response (CoMP set configuration response). In such case, the request message from the eNB1 becomes a trigger for the eNB3 to transmit the control information for CoMP.

The radio base station that transmitted the cooperating set configuration request (CoMP set configuration request) and that is notified of the timeout value of the timer may start its timer and, after expiration of the timer, may again perform the processing of the cooperating set configuration request.

<Exemplary Embodiment 2>

It is assumed that, in an exemplary embodiment 2 of the present invention, the eNB1 to eNB3 all have the function of CoMP transmission/reception, and that the cooperating set (CoMP cooperating set) configured is specific to a cell.

The present embodiment differs from the above mentioned first embodiment in that the configuration (update) of the cooperating set (CoMP cooperating set) is done not via the O&M but through just direct information exchange between eNBs.

Figure 15:
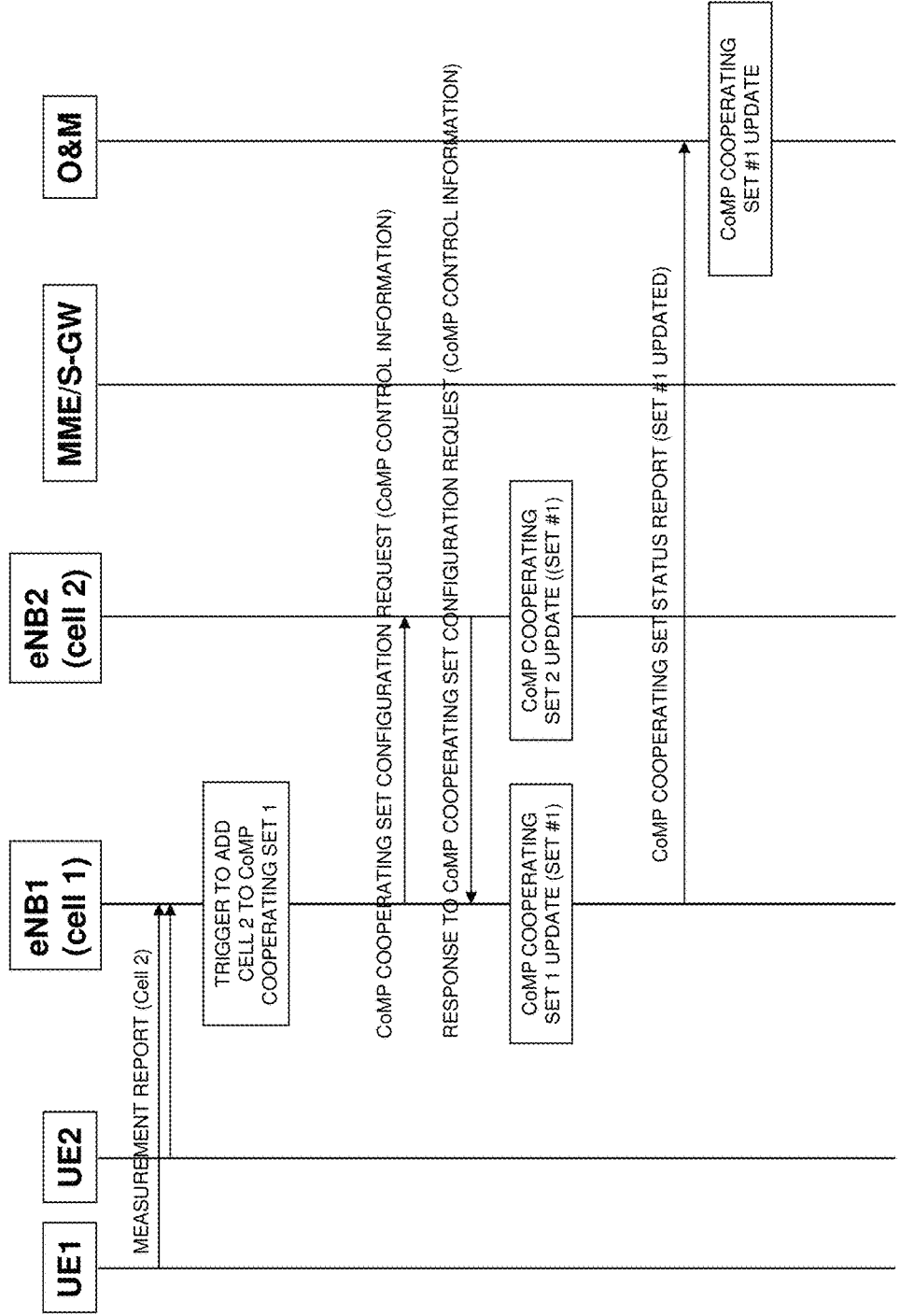
FIG. 15 is a sequence diagram for illustrating a method for configuring a cooperating set (CoMP cooperating set) according to a second exemplary embodiment of the present invention.

FIG. 15 is a sequence diagram for a case where the cell1 of the eNB1 and the cell2 of the eNB2 are configured in the same cooperating set (CoMP cooperating set).

Initially, the eNB1 instructs the UE1 and the UE2 to make measurement reports of the neighbor cells, previously (not shown). The UE1 and the UE2 make measurement reports to the eNB1 about the cell2 as respective neighbor cells.

In case the received quality of the downlink signals of the cell2, reported from the UE 1 and UE2, has met a given condition, the eNB1 notifies the eNB2 of a cooperating set (CoMP cooperating set) configuration request (CoMP set configuration request).

At this time, the notification by eNB1 to eNB2 is made by having the control information on CoMP (CoMP control information) included in the configuration request message.

The eNB2 has the CoMP transmission/reception function. Thus, the eNB2 notifies to eNB1 an acknowledge response (ACK or the equivalent information), with the control information on CoMP (CoMP control information), as a response to a cooperating set (CoMP cooperating set) configuration request (CoMP set configuration response).

On receiving an ACK from the eNB2, the eNB1 updates (or initializes) the number #1 (set #1) of the cooperating set 1 (CoMP cooperating set 1) retained by the eNB1.

After transmitting the ACK, the eNB2 also updates (or performs initial setting of) the number #1 (set #1) of the cooperating set 2 (CoMP cooperating set #2) retained by the eNB2.

The eNB1 notifies the O&M of the identifier of the cooperating set 1 (CoMP cooperating set #1), here the number (#1), and of the update information (CoMP cooperating set status report (set# updated)). It is noted that number #1 is to cover both the cell1 and the cell2. The O&M updates the information of the cooperating set number #1 it holds (CoMP cooperating set#1 update).

In this manner, the eNB1 and eNB2 complete update of the cooperating set (CoMP cooperating set), and then decide on the UE that actually takes charge of CoMP transmission/reception and on the transmission/reception configuration to perform CoMP transmission/reception.

The control information on CoMP (CoMP control information) is notified included in the message of the cooperating set configuration request/response (CoMP configuration request/response). It is however possible that no control information is included (or only part of the control information may be included) in the configuration request/response, in which the control information on CoMP (or remaining part of the control information on CoMP) may be notified as a separate message. That is, a step of the cooperating set configuration request/response (CoMP set configuration request/response) is initially carried out. In case the cooperating set configuration response (CoMP set configuration response) is an acknowledge response (ACK), the communication of the control information on CoMP may be performed.

It is also possible that the base station eNB1 transmitting the cooperating set configuration request notifies just the request message, and that the control information on CoMP is transmitted by just the base station eNB2 that returns the response (CoMP set configuration response). In this case, the request message from the eNB1 becomes a trigger for the eNB2 to transmit the control information on CoMP.

It is also possible that the radio base station that transmitted the cooperating set configuration request (CoMP set configuration request) shown in FIG. 4 and that has been notified of the timeout value of a timer may start the timer. After expiration of the timer, the radio base station may again perform the processing of a cooperating set configuration request.

The number #1 is notified to the O&M as the identifier of the cooperating set (CoMP cooperating set). However, an identifier may also be the information other than the number.

<Third Exemplary Embodiment>

In the third exemplary embodiment of the present invention, it is assumed that the eNB1 to eNB3 all have the function of CoMP transmission/reception, and that the cooperating set (CoMP cooperating set) configured is proper to the cell. The present exemplary embodiment differs from the first exemplary embodiment in that the control information on CoMP (CoMP control information) is sent from the eNB to the O&M, and in that the configuration (update) of the cooperating set (CoMP cooperating set) is performed by the O&M. Additionally, the trigger for communication of the CoMP control information in the present example is a request from the O&M (CoMP control information request).

Figure 16:
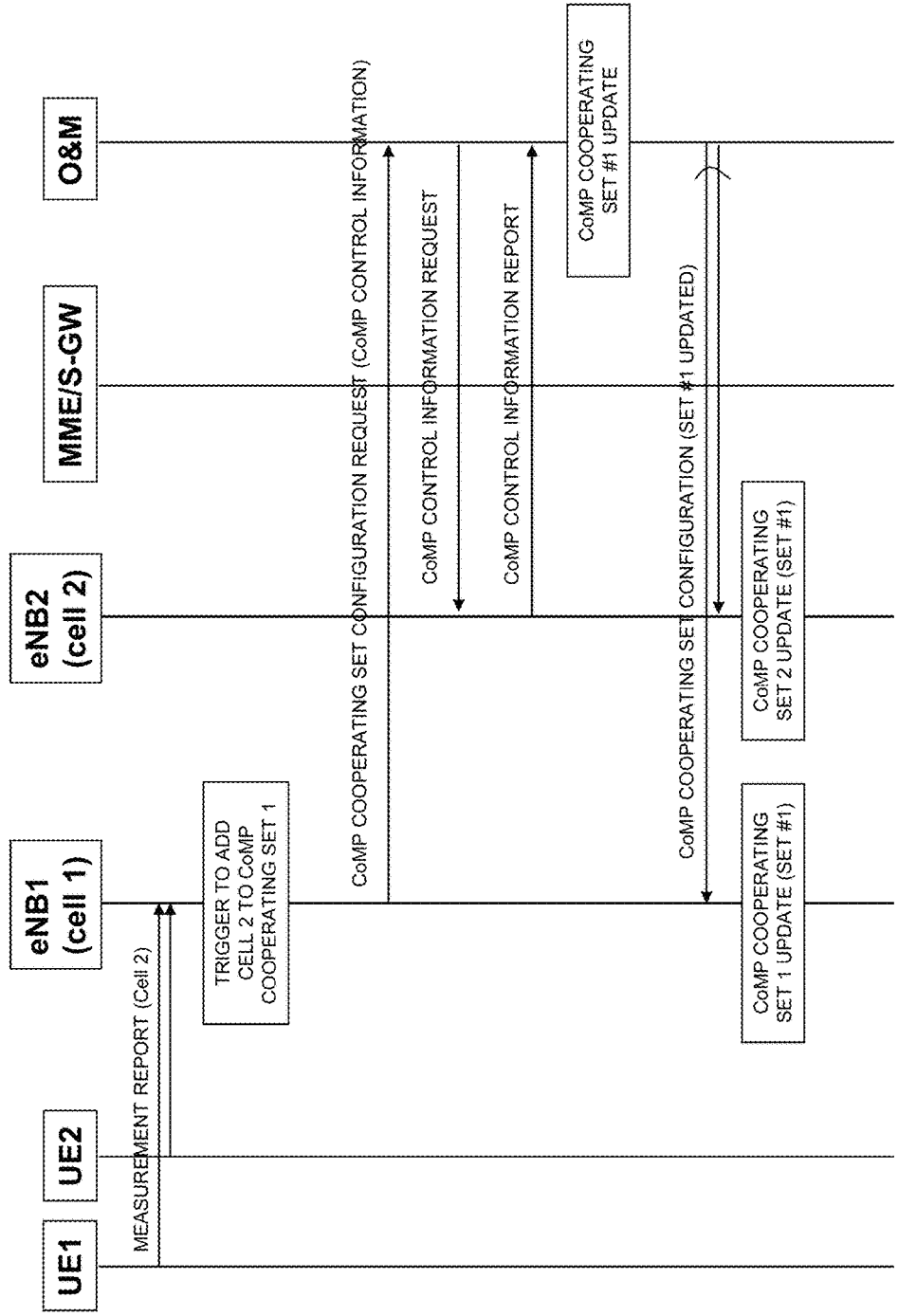
FIG. 16 is a sequence diagram for illustrating a method for configuring a cooperating set (CoMP cooperating set) according to a third exemplary embodiment of the present invention.

FIG. 16 is a sequence diagram for a case where the cell1 of the eNB1 and the cell2 of the eNB2 are included in the same cooperating set (CoMP cooperating set).

The eNB1 initially instructs the UE1 and the UE2 previously to make measurement reports on the neighbor cells (not shown). The UE1 and the UE2 perform measurement reporting of the cell2 that is a neighbor cell neighboring to the UE1 and the UE2, respectively.

In case the received quality of the downlink signal of the cell2, reported from the UE1 and UE2, satisfies a given condition, the eNB1 notifies the O&M of the control information on CoMP (CoMP control information). The CoMP control information is notified enclosed in a message of the cooperating set (CoMP cooperating set) configuration request (CoMP set configuration request). It is noted that the information on the radio base station (eNB2) or the cell (cell2), that becomes a target, for example, the cell ID or the base station ID (eNB ID), is appended to the cooperating set configuration request (CoMP set configuration request) transmitted from the eNB1 to the O&M. Or, the identifier of the cooperating set (CoMP cooperating set) may be appended to the cooperating set configuration request transmitted from the eNB1 to the O&M.

When notified of the cooperating set configuration request (CoMP set configuration request), the O&M requests the control information for CoMP (CoMP control information) from the eNB2 that becomes a target (CoMP control information request). The eNB2 notifies the O&M of the control information on CoMP (CoMP control information report).

The O&M sets up the cooperating set (CoMP cooperating set) based on the control information on CoMP (CoMP control information) (CoMP cooperating set#1 update).

In the present exemplary embodiment, the O&M determines that the cell1 of eNB1 and the cell2 of eNB2 are to be added to the same cooperating set #1 (CoMP cooperating set #1), and notifies the eNB1 and eNB2 of the determination. At this time, the serial number (#1), for example, is appended as an identifier of the cooperating set (CoMP cooperating set) (CoMP cooperating set configuration (set#1 updated)).

The eNB1 and the eNB2 update the information on the cooperating sets (CoMP cooperating sets) they have (CoMP cooperating set#1 (set#2), update) and recognize each other as the counterpart of cooperation. This allows actually performing CoMP transmission/reception.

The information included in the cooperating set configuration (CoMP cooperating set configuration), the O&M notifies to the eNB1, eNB2, may include:

the above mentioned information of the cooperating sets (CoMP cooperating sets) (identifier and cell ID);

functional information of CoMP transmission/reception (for example, the CoMP transmission/reception scheme being supported);

access stratum (AS) configuration information; and so forth.

In the present example, the quality of the cell2 reported by UE satisfying a given condition becomes a trigger for the eNB1 to transmit the control information on CoMP. On the other hand, the request from the control station (O&M) becomes a trigger for the eNB2 to transmit the control information on CoMP.

The control information on CoMP (CoMP control information) is notified included in a message of the cooperating set configuration request/response. It is also possible that no control information is included in the configuration request/response (or only part of the control information may be included in the configuration request/response). In that case, the control information on CoMP (the remaining portion of the control information on CoMP) may be notified as a separate message. That is, the step of the cooperating set configuration request/response (CoMP set configuration request/response) is initially performed. In case the cooperating set configuration response (CoMP set configuration response) is an acknowledge response (ACK), the control information on CoMP may be communicated.

The O&M, which transmitted the cooperating set configuration request (CoMP set configuration request), shown in FIG. 4, and which is notified of the timeout value of the timer, may then start a timer. The O&M may again perform the processing of cooperating set configuration request after expiration of the timer. The present exemplary embodiment differs from the exemplary embodiments 1, 2 in that an entity that actuates the timer is the O&M.

<Fourth Exemplary Embodiment>

In a fourth embodiment of the present invention, it is assumed that the eNB1 to eNB3 all have the CoMP transmission/reception function, and that the CoMP cooperating set configured is proper to each cell. The present exemplary embodiment differs from the first exemplary embodiment in that the control information on CoMP (CoMP control information) is notified from the eNB to the O&M, and in that the O&M determines the initial configuration of the cooperating set (CoMP cooperating set) based on the location of the eNB (cell).

Figure 17:
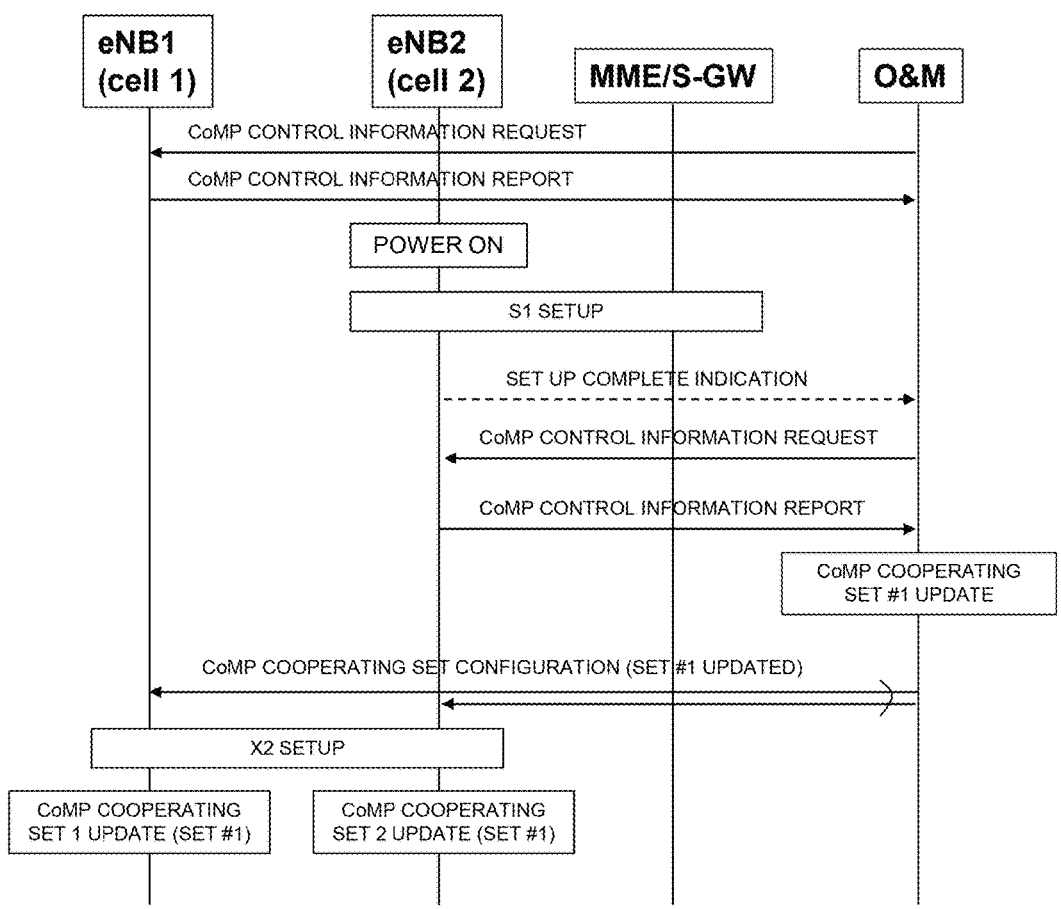
FIG. 17 is a sequence diagram for illustrating a method for configuring a cooperating set (CoMP cooperating set) according to a fourth exemplary embodiment of the present invention.
Figure 18:
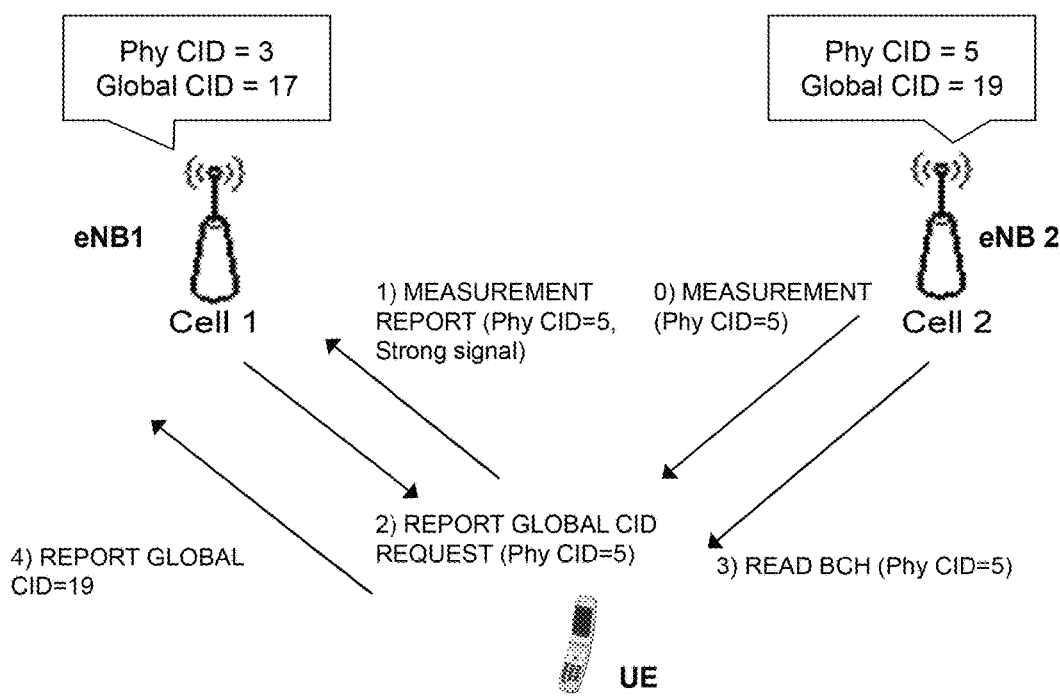
FIG. 18 is a diagram for illustrating an ANR function.
Figure 19:
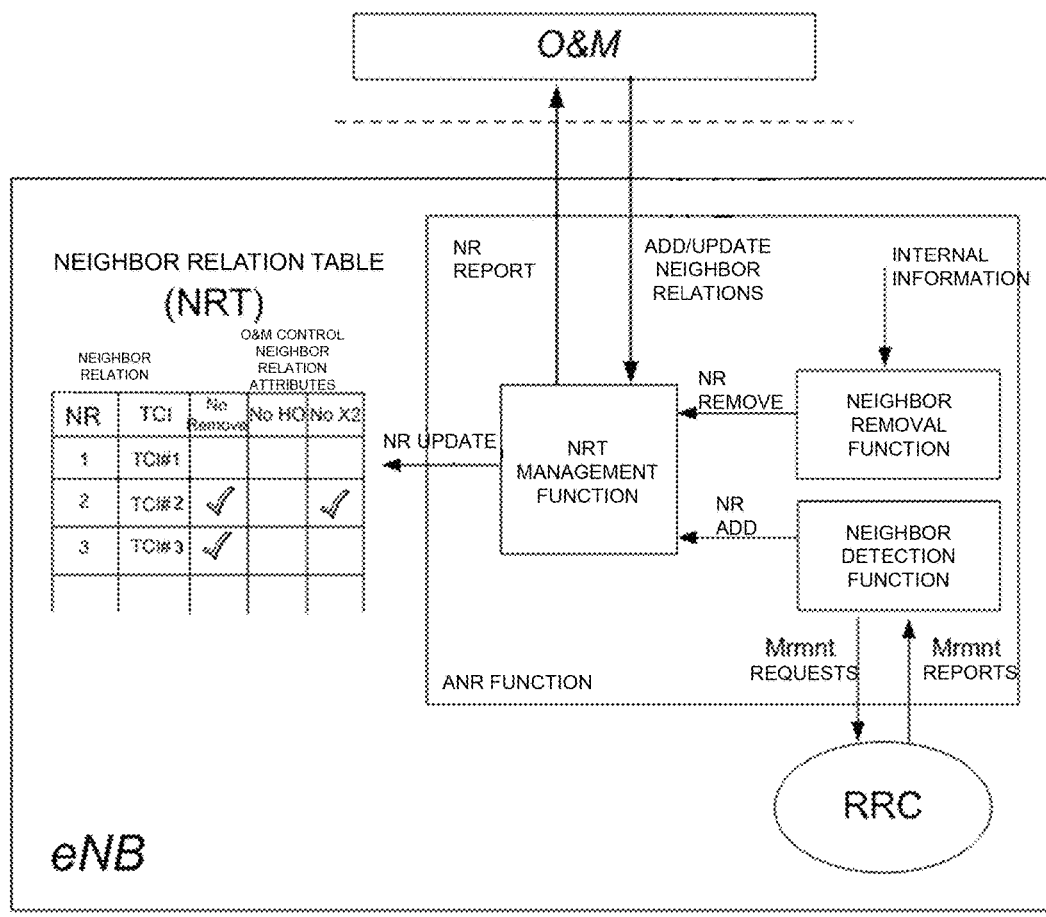
FIG. 19 is a diagram for illustrating the NRT and the ANR function.

FIG. 17 is a sequence diagram for a case where cell1 of the eNB1 and cell2 of the eNB2 are configured in the same cooperating set (CoMP cooperating set).

In an initial state, the eNB2 has not been introduced (started), and just the eNB1 is connected to the O&M.

Initially, the eNB1, responsive to a request for control information on CoMP from the O&M (CoMP control information request) makes a report on the control information (CoMP control information report).

It is assumed that, at a certain point in time, the eNB2 is introduced (started). The eNB2 then sets up connection with the network (MME/S-GW) (S1 setup) and notifies the completion of connection to the O&M (setup compete indication).

The O&M requests the control information on CoMP from eNB2 (CoMP control information request) and the eNB2 makes a report on the control information (CoMP control information report).

The O&M sets up the cooperating set (CoMP cooperating set) based on the control information on CoMP of the eNB1 and the eNB2 (CoMP cooperating set#1 update).

In the present exemplary embodiment, the O&M determines on addition of the cell1 of eNB1 and the cell2 of eNB2 to the same cooperating set (CoMP cooperating set #1) and notifies the eNB1 and eNB2 of the determination. At this time, the number (#1), for example, is appended as an identifier of the cooperating set (CoMP cooperating set) (CoMP cooperating set configuration set #1 updated).

The eNB1 and the eNB2 recognize that they belong to the same cooperating set (CoMP cooperating set) to perform connection therebetween (connection setup) (X2 setup).

After X2 setup completion, the information of the cooperating set (CoMP cooperating set) held by the eNB1 and eNB2 is updated (CoMP cooperating set #1 (set #2), update). This allows actually executing CoMP transmission/reception.

The information included in the cooperating set configuration (CoMP cooperating set configuration), the O&M notifies to the eNB1, eNB2, may include:
- the above mentioned information of the cooperating set (CoMP cooperating set) (identifier and cell ID); and, in addition,
- the functional information of CoMP transmission/reception (for example, the supported CoMP transmission/reception scheme); and
- the access stratum (AS) configuration information.

The O&M, which transmitted the cooperating set configuration request (CoMP set configuration request), shown in FIG. 4, and which is notified of the timeout value of the timer, may then start a timer. The O&M may again perform the processing of the cooperating set configuration request after expiration of the timer. The present exemplary embodiment differs from the exemplary embodiments 1, 2 in that an entity that actuates the timer is the O&M.

Figure 21:
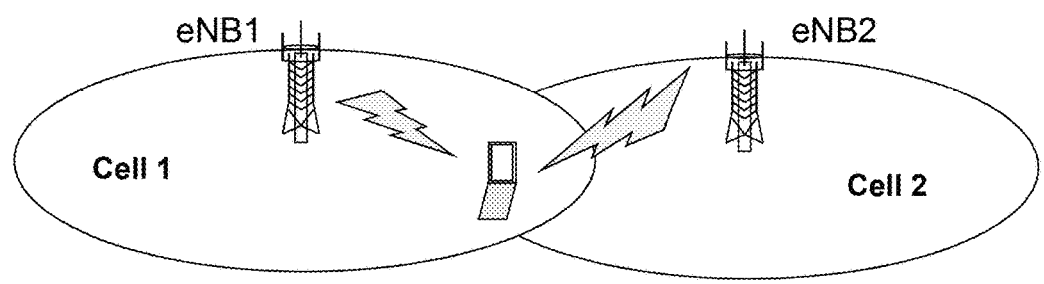
FIG. 21 is a diagram for illustrating the CoMP of eNBs.

In the previous exemplary embodiment, CoMP transmission/reception is from one of a plurality of radio base stations to another (see FIG. 21). However, CoMP transmission/reception may also be via a relay node (RN). The multiple radio base stations that perform CoMP transmission/reception may be
- combination of one or a plurality of radio base stations and a relay node; or
- a plurality of relay nodes, and they perform CoMP transmission/reception for a single terminal. In the latter case, the multiple relay nodes may belong to the same radio base station, given that cells of the relay nodes are neighboring to one another, or may belong to different radio base stations.

In these cases, notification or exchange of the control information on CoMP or the information exchange of the cooperating set (CoMP cooperating set) is between eNB and RN or between different RNs. In this case, the eNB, which is an upper layer station to the RN, is corresponding to the other radio base station. The control information on CoMP may be transmitted with the request for connection setup between the eNB and the RN as a trigger.

Figure 22A:
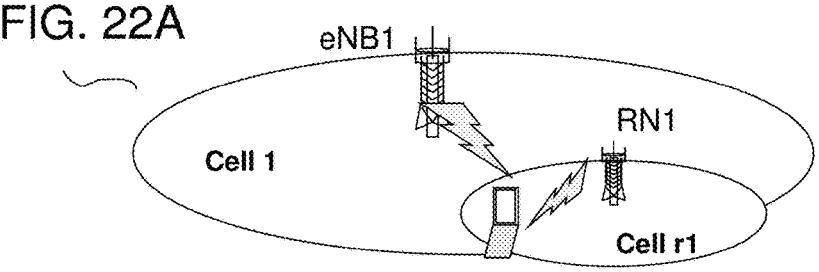
FIGS. 22A to 22C are diagrams for illustrating the CoMP of relay nodes.

In an example shown in FIG. 22A, for example, the eNB1 and RN 1 belonging to the eNB1 is performing CoMP transmission/reception for a terminal in a cell of RN1 (cell r1).

Figure 22B:
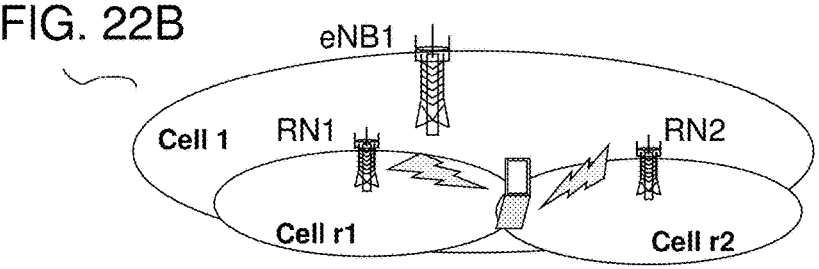

In an example shown in FIG. 22B, relay nodes RN 1 and RN 2, belonging to the same base station eNB1, are performing CoMP transmission/reception for one terminal. In this case, the RN 1 and RN 2 may transmit the control information on CoMP via eNB1 or not via eNB1, that is, directly. Or, the eNB1 may hold the control information on CoMP for each of RN 1 and RN 2, while the RN 1 and RN 2 respectively perform communication with the eNB1. To readily and promptly implement this communication, such a method may be used in which, when each RN has established connection with an eNB as a donor (destination of attachment), the control information on CoMP is communicated.

Figure 22C:
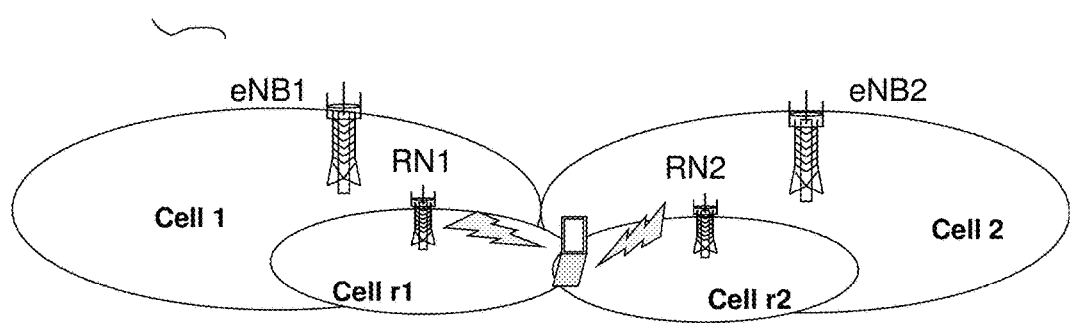

In an example of FIG. 22C, the relay stations RN 1 and RN 2, that belong to different radio base stations, perform CoMP transmission/reception for one terminal. In this case, such a method may be used in which RN 1 and RN 2 communicate the control information directly or via eNB1 and eNB2. Or, such a method may be used in which the eNB1 holds the control information on CoMP of RN 1, the eNB2 holds the control information on CoMP of RN 2, and RN 1 acquires the control information on CoMP from eNB2, while RN2 acquiring the control information on CoMP from eNB1. In a further method, the eNB1 holds the control information on CoMP of RN 2, the eNB2 holds the control information on CoMP of RN 2, and RN 1 acquires the control information on CoMP of RN 2 from eNB1, while RN 2 acquires the control information on CoMP of RN 1 from eNB2.

In the CoMP transmission/reception, not only the relay nodes but also RRH (Remote Radio Head), as a radio unit of the radio base station, or a remote base station RRE (Remote Radio Equipment) may be used.

In the above described exemplary embodiments, the radio communication system is assumed to be 3GPP LTE. However, the present invention is not limited thereto and may be applied to, for example, 3GPP WCDMA (Wideband Code Division Multiple Access), GSM (Global System for Mobile Communications), or to WiMAX (Worldwide Interoperability for Microwave Access).

The exemplary embodiments or examples may be changed or adjusted within the framework of the total of the disclosures of the claims, inclusive of claims, based on the fundamental technical concept of the invention. Further, variegated combinations or selection of elements disclosed herein may be made within the framework of the claims. That is, the present invention may encompass various modifications or corrections that may occur to those skilled in the art in accordance with the within the gamut of the entire disclosure of the present invention, inclusive of claim and the technical concept of the present invention.

The invention claimed is:

1. A radio station comprising:
a processor that is configured to control Coordinated Multi Point (CoMP) transmission cooperating with another radio station; and
a transmitter that is configured to transmit, to the another radio station, CoMP information that includes:
one or multiple identities of one or multiple cells on which the CoMP transmission is capable of being performed; and
information regarding one or multiple physical resource blocks of the one or multiple cells on which the CoMP transmission is capable of being performed, the one or multiple cells being specific to a cell belonging to the radio station and including a cell belonging to the another radio station.

2. The radio station according to claim 1, wherein the CoMP information includes information regarding one or multiple physical resource blocks of the one or multiple cells on which the CoMP transmission is performed.

3. The radio station according to claim 1, wherein the CoMP information includes one or multiple identities of the one or multiple cells on which the CoMP transmission is performed.

4. The radio station according to claim 1, wherein the CoMP information is transmitted to the another radio station via an X2 interface.

5. The radio station according to claim 1, further comprising:
a receiver that is configured to receive a measurement report of Reference Signal Received Power(RSRP),
wherein the measurement report is used to at least one of determine or validate the CoMP information.

6. A radio terminal comprising:
a transceiver configured to perform data communication with at least one of a first radio station and a second radio station,
wherein the first radio station comprises:
a processor that is configured to control Coordinated Multi Point (CoMP) transmission cooperating with the second radio station; and
a transmitter that is configured to transmit, to the second radio station, CoMP information that includes:
one or multiple identities of one or multiple cells on which the CoMP transmission is capable of being performed; and
information regarding one or multiple physical resource blocks of the one or multiple cells on which the CoMP transmission is capable of being performed, the one or multiple cells being specific to a cell belonging to the radio station and including a cell belonging to the second radio station.

7. The radio terminal according to claim 6, wherein the CoMP information includes information regarding one or multiple physical resource blocks of the one or multiple cells on which the CoMP transmission is performed.

8. The radio terminal according to claim 6, wherein the CoMP information includes one or multiple identities of the one or multiple cells on which the CoMP transmission is performed.

9. The radio terminal according to claim 6, wherein the CoMP information is transmitted to the second radio station via an X2 interface.

10. The radio terminal according to claim 6:
the transceiver is configured to transmit a measurement report of Reference Signal Received Power(RSRP), and
the measurement report is used to at least one of determine or validate the CoMP information.

11. A radio communication system comprising:
a radio terminal;
a first radio station and a second radio station,
wherein the first radio station and the second radio station take part in data transmission/reception with the radio terminal,
wherein the first radio station comprises:
a processor that is configured to control Coordinated Multi Point (CoMP) transmission cooperating with the second radio station; and
a transmitter that is configured to transmit, to the second radio station, CoMP information that includes:
one or multiple identities of one or multiple cells on which the CoMP transmission is capable of being performed; and
information regarding one or multiple physical resource blocks of the one or multiple cells on which the CoMP transmission is capable of being performed, the one or multiple cells being specific to a cell belonging to the radio station and including a cell belonging to the second radio station.

12. A method for radio communication, the method comprising:
controlling, by a radio station, Coordinated Multi Point (CoMP) transmission cooperating with another radio station; and
transmitting, to the another radio station, CoMP information that includes:
one or multiple identities of one or multiple cells on which the CoMP transmission is capable of being performed; and
information regarding one or multiple physical resource blocks of the one or multiple cells on which the CoMP transmission is capable of being performed, the one or multiple cells being specific to a cell belonging to the radio station and including a cell belonging to the another radio station.

13. The method for radio communication according to claim 12, wherein the CoMP information includes information regarding one or multiple physical resource blocks of the one or multiple cells on which the CoMP transmission is performed.

14. The method for radio communication according to claim 12, wherein the CoMP information includes one or multiple identities of the one or multiple cells on which the CoMP transmission is performed.

15. The method for radio communication according to claim 12, wherein the CoMP information is transmitted to the another radio station via an X2 interface.

16. The method for radio communication according to claim 12, further comprising:
receiving a measurement report of Reference Signal Received Power(RSRP), wherein the measurement report is used to at least one of determine or validate the CoMP information.

17. A method for radio communication, the method comprising:
performing, by a radio terminal, data communication with at least one of a first radio station and a second radio station;
controlling, by the first radio station, Coordinated Multi Point (CoMP) transmission cooperating with the second radio station; and
transmitting, to the second radio station, CoMP information that includes:
one or multiple identities of one or multiple cells on which the CoMP transmission is capable of being performed; and
information regarding one or multiple physical resource blocks of the one or multiple cells on which the CoMP transmission is capable of being performed, the one or multiple cells being specific to a cell belonging to the radio station and including a cell belonging to the second radio station.

18. A non-transitory computer-readable recording medium storing a program that causes a processor provided on a radio station to execute a process comprising:
controlling Coordinated Multi Point (CoMP) transmission cooperating with another radio station; and
transmitting, to the another radio station, CoMP information that includes:
one or multiple identities of one or multiple cells on which the CoMP transmission is capable of being performed; and
information regarding one or multiple physical resource blocks of the one or multiple cells on which the CoMP transmission is capable of being performed, the one or multiple cells being specific to a cell belonging to the radio station and including a cell belonging to the another radio station.

19. A non-transitory computer-readable recording medium storing a program that causes a processor provided on a radio terminal to execute a process comprising:
performing data communication with at least one of a first radio station and a second radio station,
wherein the first radio station controls Coordinated Multi Point (CoMP) transmission cooperating with the second radio station, and transmits, to the second radio station, CoMP information that includes:
one or multiple identities of one or multiple cells on which the CoMP transmission is capable of being performed; and
information regarding one or multiple physical resource blocks of the one or multiple cells on which the CoMP transmission is capable of being performed, the one or multiple cells being specific to a cell belonging to the radio station and including a cell belonging to the second radio station.

* * * * *

UNITED STATES PATENT AND TRADEMARK OFFICE
CERTIFICATE OF CORRECTION

PATENT NO. : 10,224,985 B2
APPLICATION NO. : 14/802612
DATED : March 5, 2019
INVENTOR(S) : Hisashi Futaki Page 1 of 1

It is certified that error appears in the above-identified patent and that said Letters Patent is hereby corrected as shown below:

In the Specification

Column 3, Background, Lines 22-23; Delete:
"http://list.etsi.org/scripts/wa.exe.?A2=ind0907&L=3gpp_tsg_ran_wgl&T=0&O=A&P=6822"
And insert:
--http://list.etsi.org/scripts/wa.exe.?A2=ind0907&L=3gpp_tsg_ran_wg1&T=0&O=A&P=6822--
therefor Signed and Sealed this
Thirtieth Day of July, 2019

Andrei Iancu
*Director of the United States Patent and Trademark Office*